(12) United States Patent
Kang et al.

(10) Patent No.: US 12,542,425 B2
(45) Date of Patent: Feb. 3, 2026

(54) VCSEL ARRAY WITH DIFFERENT EMITTER STRUCTURES

(71) Applicant: SHENZHEN RAYSEES AI TECHNOLOGY Co. Ltd., Guangdong (CN)

(72) Inventors: Dongseok Kang, Sunnyvale, CA (US); Siva Kumar Lanka, Reno, NV (US); Yongxiang He, Sunnyvale, CA (US); Yang Wang, Hefei (CN)

( * ) Notice: Subject to any disclaimer, the term of this patent is extended or adjusted under 35 U.S.C. 154(b) by 638 days.

(21) Appl. No.: 17/922,911

(22) PCT Filed: Aug. 16, 2021

(86) PCT No.: PCT/CN2021/112697
§ 371 (c)(1),
(2) Date: Nov. 2, 2022

(87) PCT Pub. No.: WO2023/019384
PCT Pub. Date: Feb. 23, 2023

(65) Prior Publication Data
US 2024/0222936 A1    Jul. 4, 2024

(51) Int. Cl.
*H01S 5/183* (2006.01)
*H01S 5/42* (2006.01)

(52) U.S. Cl.
CPC ...... *H01S 5/18311* (2013.01); *H01S 5/18313* (2013.01); *H01S 5/18361* (2013.01); *H01S 5/423* (2013.01)

(58) Field of Classification Search
CPC ............. H01S 5/18311; H01S 5/18313; H01S 5/18361; H01S 5/423; H01S 5/04256; H01S 5/18347; H01S 2301/176; H01S 5/18394; G01S 7/4815
See application file for complete search history.

(56) References Cited

U.S. PATENT DOCUMENTS

| | | |
|---|---|---|
| 10,199,794 B1 | 2/2019 | Yuen |
| 2008/0240196 A1 | 10/2008 | Nishida |
| 2017/0033535 A1 | 2/2017 | Joseph |
| 2017/0353012 A1* | 12/2017 | Barve ................. H01S 5/423 |
| 2019/0089128 A1 | 3/2019 | Lin et al. |
| 2020/0303902 A1 | 9/2020 | Moench et al. |
| 2020/0321755 A1* | 10/2020 | Wang ................ H01S 5/18313 |
| 2021/0135429 A1 | 5/2021 | Chang-Hasnain et al. |

OTHER PUBLICATIONS

Office actions from Chinese counterpart (application No. 202180009863. 3) and translations from USPTO's global dossier.

* cited by examiner

*Primary Examiner* — Yuanda Zhang
(74) *Attorney, Agent, or Firm* — Jigang Jin

(57) ABSTRACT

A VCSEL array includes VCSEL structures on a substrate. Each VCSEL structure includes a first reflector region over the substrate, an active region over the first reflector region, a second reflector region over the active region, and an oxide aperture proximate to the active region. An oxide aperture of a VCSEL structure that is in a central region of the VCSEL array is larger than an oxide aperture of a VCSEL structure that is in an edge region of the VCSEL array.

20 Claims, 18 Drawing Sheets

VCSEL ARRAY WITH DIFFERENT EMITTER STRUCTURES

CROSS-REFERENCE TO RELATED APPLICATIONS

This application is the U.S. National Stage of International Application No. PCT/CN2021/112697, filed Aug. 16, 2021, the content of which is incorporated herein by reference in its entirety.

FIELD OF INVENTION

This invention generally relates to a Vertical Cavity Surface Emitting Laser (VCSEL) array and specifically to a VCSEL array with different emitter structures.

BACKGROUND OF THE INVENTION

Compared to edge-emitting semiconductor lasers with a horizontal Fabry-Perot resonator and cleaved facets acting as mirrors, VCSELs have a vertical cavity and emit a circular beam normal to the surface. VCSELs have many advantages over edge-emitting semiconductor lasers such as compact size, small beam spot, low beam divergence, narrow spectral width, low temperature sensitivity of wavelength, fast rise time, and ease of fabricating two-dimensional (2D) VCSEL array, etc.

In recent years, VCSEL arrays become a prominent player in high-resolution three-dimensional (3D) sensing applications. For instance, many smartphones are equipped with a VCSEL-array-based 3D sensor using the Time-of-Flight (ToF) method or the structured light method for facial recognition. In addition, VCSEL-array-based systems, such as light detection and ranging (LIDAR) systems, have entered the emerging autonomous vehicle landscape. LIDAR is based on ToF measurement principles. It illuminates a scene with a laser beam. The beam is scattered by objects of the scene. It then detects the bounce-back of the beam. The distance is calculated by the time it takes for the beam to travel to the objects and back from them. LIDAR enables real-time 3D mapping of the surrounding environment, and can help recognize running vehicles and walking pedestrians on a road effectively and quickly, and thus may prevent fatal accidents and mitigate one of the most challenging issues a driverless car faces.

In a traditional VCSEL array, every VCSEL emitter has the same structure, i.e., dimensions of the VCSEL emitters are the same. For example, dimensions of the contact metal, the p-type reflector region, and the oxide aperture are the same among the VCSEL emitters. At the very early stage of operation, the VCSEL emitters initially have the same temperature and generate the same output power. Thereafter, each individual VCSEL emitter produces heat that is accumulated in the chip and increases the VCSEL temperature. The VCSEL emitters at the central area exhibit a higher temperature because those emitters are surrounded by other VCSEL emitters that also generate heat. Consequently, a temperature profile in a VCSEL array shows a gradual increase from an edge region to the center of the array. When the temperature of a VCSEL emitter becomes higher, its output power decreases. Thus, the output intensity in the central region of the array becomes lower than that in the edge region and the intensity uniformity is affected. Intensity uniformity of a VCSEL array is an important factor in 3D sensing. When the intensity is not uniform, the quality of 3D sensing is compromised.

Therefore, there exists a need to improve the structure of a VCSEL array and to improve the intensity uniformity of a VCSEL array.

SUMMARY OF THE INVENTION

The present invention discloses methods and apparatus for a VCSEL array with different emitter structures. In one aspect, a VCSEL array includes a substrate and VCSEL structures over the substrate. Each VCSEL structure includes a first reflector region formed over the substrate, an active region formed over the first reflector region, a second reflector region formed over the active region, and an oxide aperture formed proximate to the active region. An oxide aperture of a VCSEL structure that is in a central region of the VCSEL array is larger than an oxide aperture of a VCSEL structure that is in an edge region of the VCSEL array.

In another aspect, a method for fabricating a VCSEL array includes fabricating multiple VCSEL structures over a substrate, Fabricating each VCSEL structure includes forming a first reflector region over the substrate, forming an active region over the first reflector region, forming a second reflector region over the active region, and forming an oxide aperture proximate to the active region. An oxide aperture of a VCSEL structure that is in a central region of the VCSEL array is larger than an oxide aperture of a VCSEL structure that is in an edge region of the VCSEL array.

In another aspect, a VCSEL array includes a substrate, first VCSEL structures over the substrate, and second VCSEL structures over the substrate. The first VCSEL structures each are closer to a central region of the VCSEL array than the second VCSEL structures. A dimension of oxide apertures of the first VCSEL structures is larger than a dimension of oxide apertures of the second VCSEL structures.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Detailed description of the present invention is provided below along with figures and embodiments, which further clarifies the objectives, technical solutions, and advantages of the present invention. It is noted that schematic embodiments discussed herein are merely for illustrating the invention. The present invention is not limited to the embodiments disclosed.

Figure 1A:
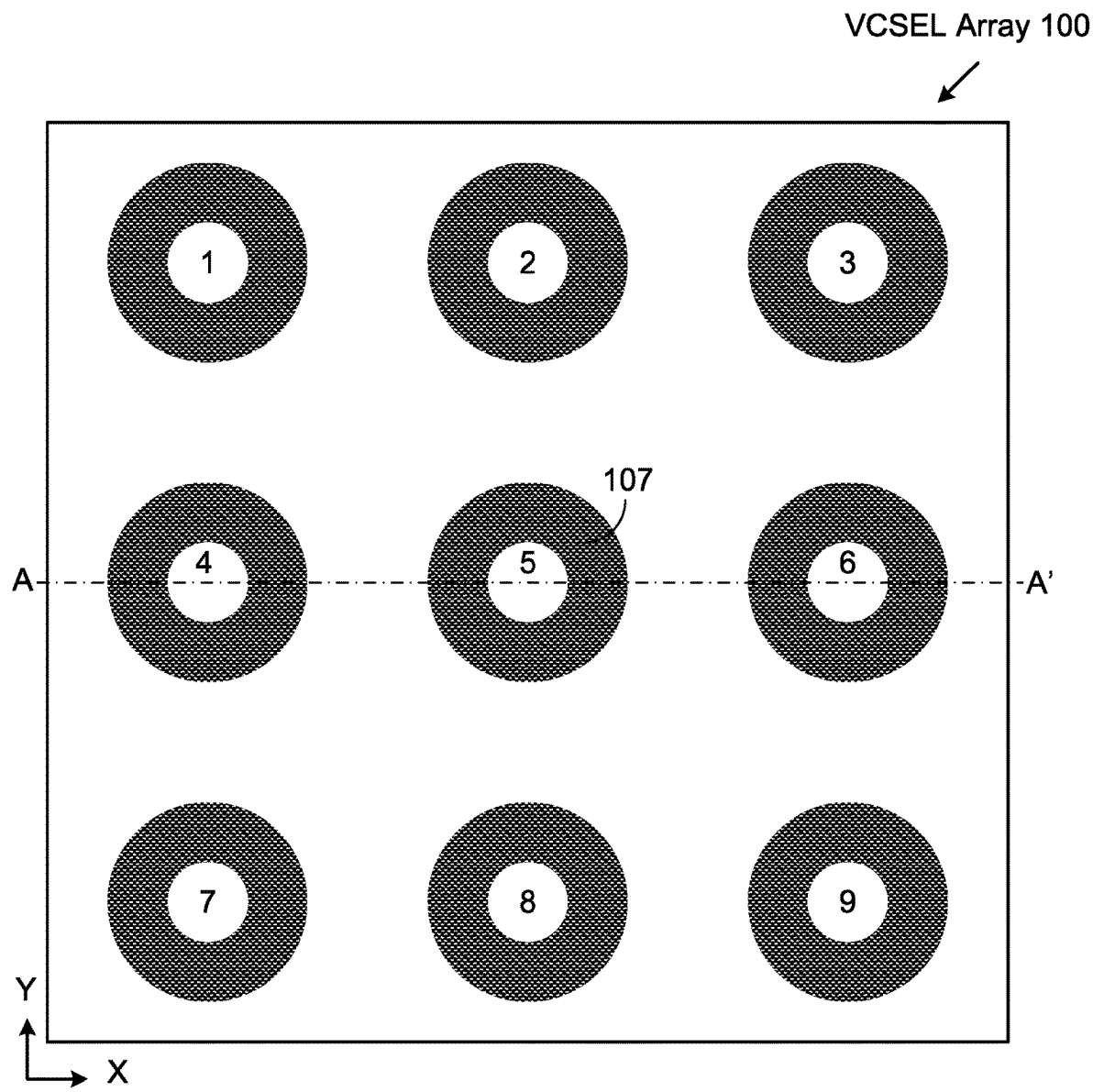
FIGS. 1A and 1B are a top view and a cross-sectional view of a prior art VCSEL array structure.
Figure 1B:
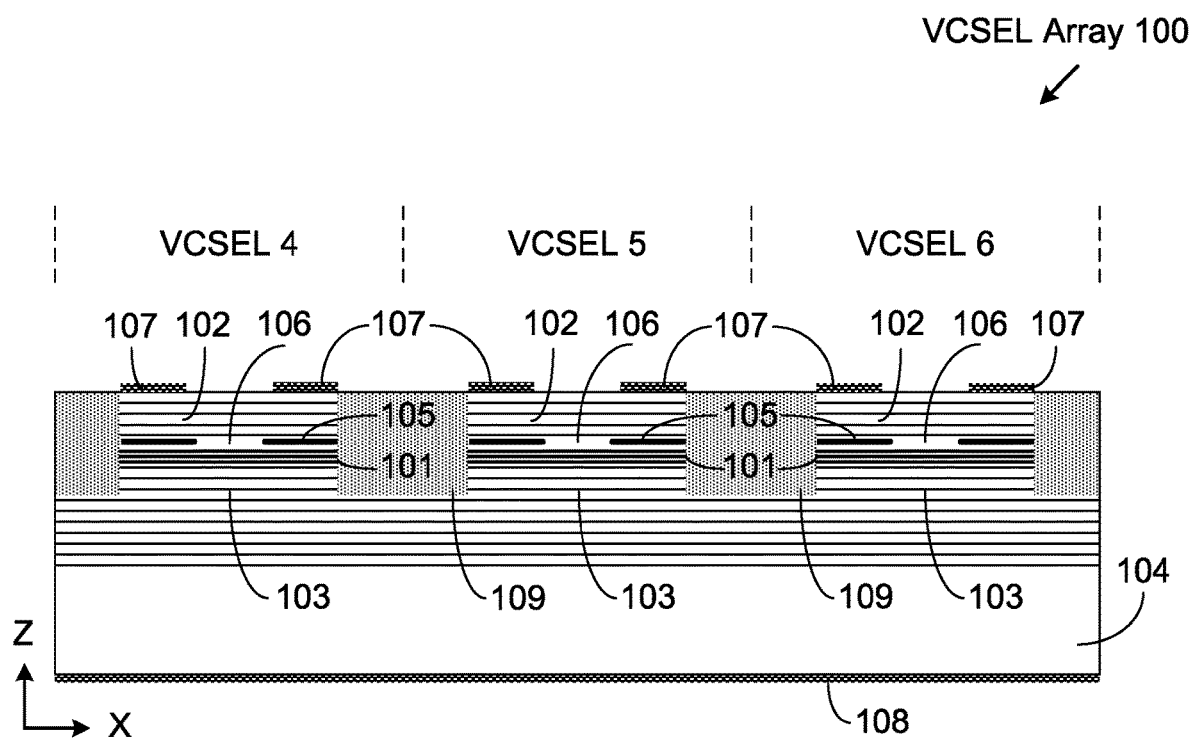

FIGS. 1A and 1B show a prior art VCSEL array 100 in a top view and a cross-sectional view, respectively. FIG. 1B shows the cross-sectional view along a line AA' of FIG. 1A. VCSEL array 100 includes VCSEL emitters 1-9. The VCSEL emitters are separated by an isolation structure such as an isolation region or an ion implantation region. VCSEL array 100 represents a top-emitting VCSEL array structure. Each VCSEL emitter emits a laser beam through the top surface when charged with an electrical current. As used herein, a VCSEL, VCSEL structure, and VCSEL emitter have the same meaning and may be used interchangeably.

As shown in FIG. 1B, a VCSEL emitter (e.g., VCSEL 4, 5, or 6) includes an active region 101, a top reflector region 102, and a bottom reflector region 103, each of which includes layers grown epitaxially above a substrate 104. Active region 101 contains a single quantum well region or a multi-quantum-well (MQW) region. The VCSEL emitter also includes an oxide layer 105 that forms an oxide aperture 106.

Top reflector region 102 contains a p-type Distributed Bragg Reflector (DBR). Bottom reflector region 103 contains an n-type DBR. Reflector regions 102 and 103 are electrically conductive. A metal layer 107, as contact metal, is deposited on the top surface of reflector region 102, followed by deposition of a dielectric layer (not shown). On the bottom surface of substrate 104, a metal layer 108 is deposited. Metal layers 107 and 108 serve as the anode and cathode contacts, respectively.

VCSEL emitters 1-9 have the same dimensions. For example, areas of the metal layers 107 are the same for all emitters, as shown in FIG. 1A, In addition, areas of the reflector regions 102 are the same for all emitters and areas of the oxide apertures 106 are the same as well. During operation, each VCSEL emitter generates the same amount of heat initially. As emitter 5 is at the center of array 100 and surrounded by other emitters, emitter 5 experiences the highest temperature in the array. Thus, the output power of emitter 5 is adversely affected and becomes lower than that of rest of the emitters. The center of VCSEL array 100 can be less bright than the edge areas and an image obtained can be distorted in 3D sensing applications.

Figure 2A:
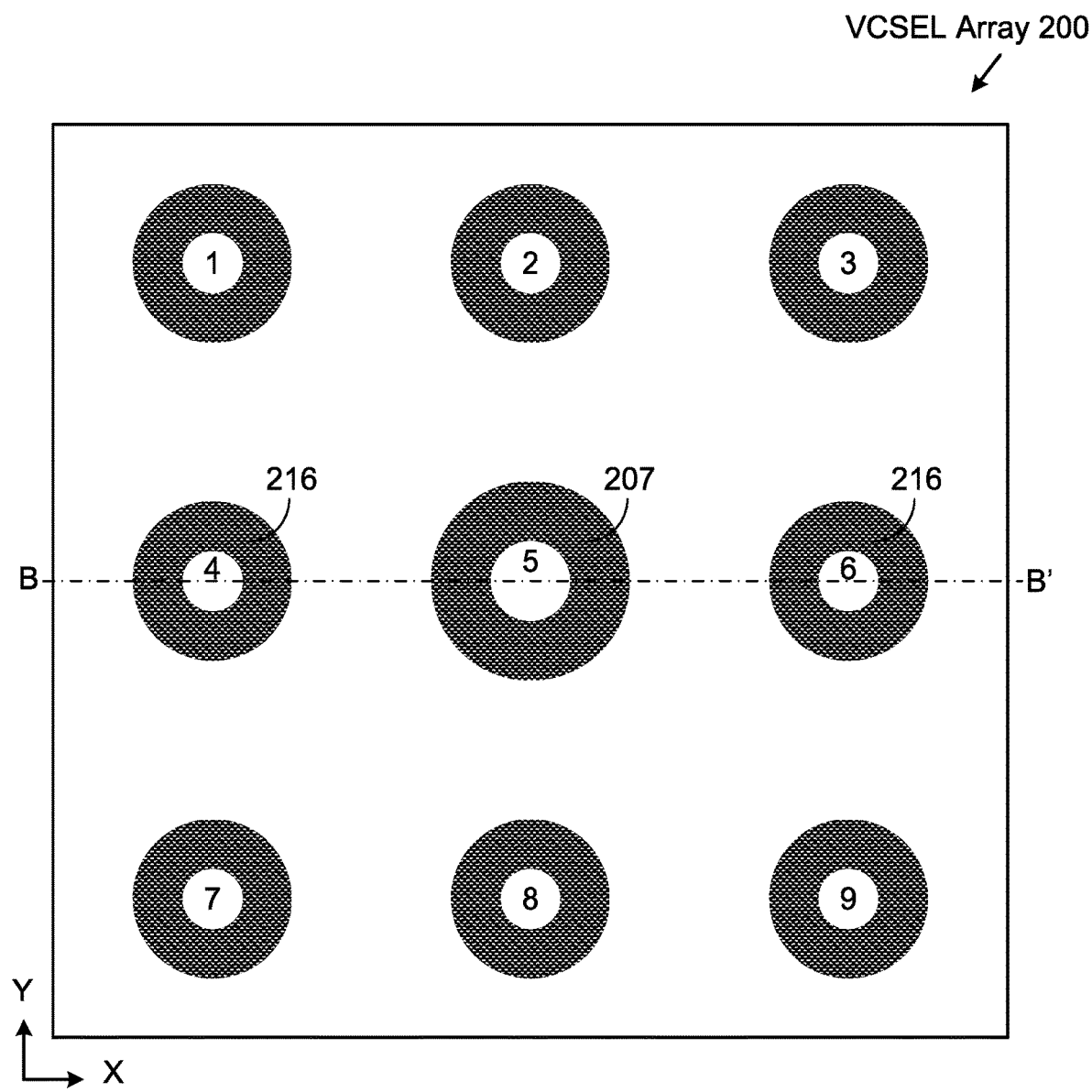
FIGS. 2A and 2B schematically illustrate a top view and a cross-sectional view of a VCSEL array, according to one embodiment of the present invention.
Figure 2B:
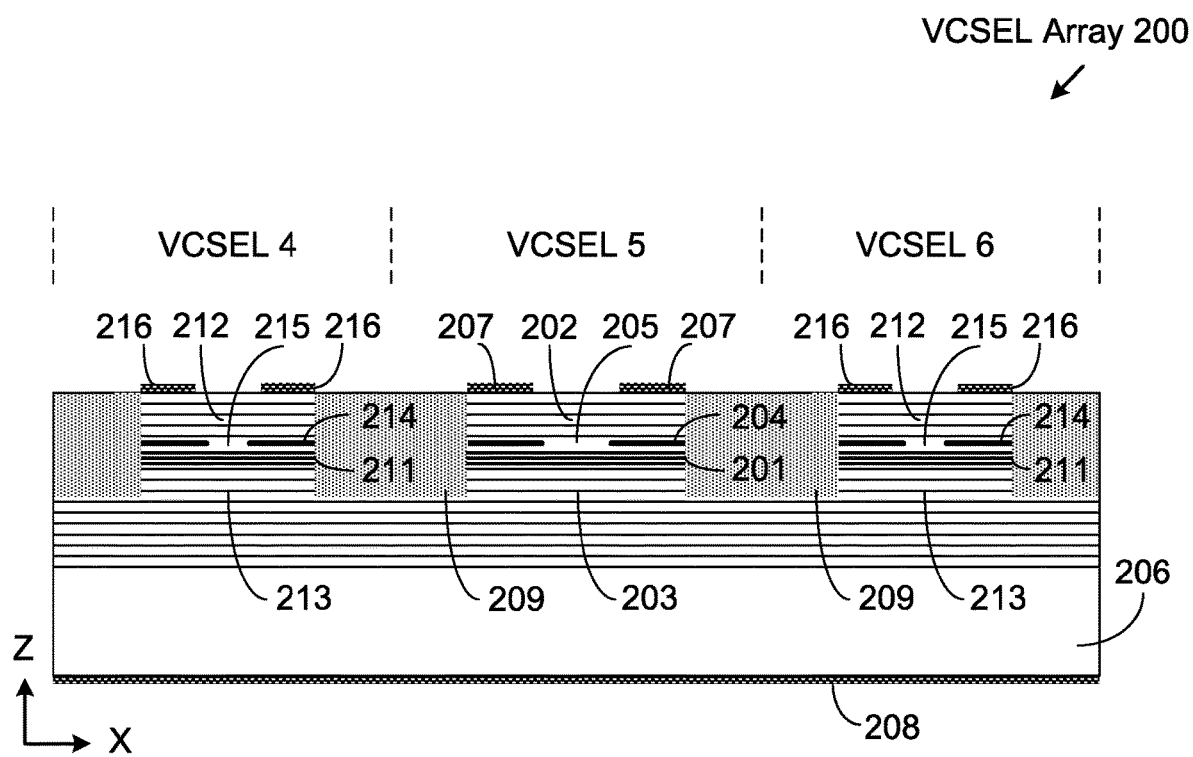

FIGS. 2A and 2B schematically illustrate a VCSEL array 200 according to one embodiment of the present invention. FIG. 2A shows a top view, while FIG. 2B shows a cross-sectional view along a line BB' of FIG. 2A. A VCSEL array such as array 200 may include thousands or tens of thousands of VCSEL emitters or VCSELs. In FIGS. 2A and 2B and other figures illustrated below, only a few VCSELs are used for explaining principles and methods of a VCSEL array.

As shown in FIGS. 2A and 2B, array 200 may include VCSELs 1-9. VCSEL 5 is at the center of the array and surrounded by VCSELs 1-4 and 6-9. Some dimensions of VCSEL 5 are larger than those of VCSELs 1-4 and 6-9 in the X-Y plane. VCSEL 5 may include an active region 201, a top reflector region 202, a bottom reflector region 203, and an oxide layer 204 that forms an oxide aperture 205. VCSELs 1-4 and 6-9 each may include an active region 211, a top reflector region 212, a bottom reflector region 213, and an oxide layer 214 that forms an oxide aperture 215. Regions 201-203 and 211-213 each include multiple layers that are grown epitaxially over a substrate 206. Top reflector regions 202 and 212 may include a conductive p-type DBR structure. Bottom reflector regions 203 and 213 may include a conductive n-type DBR structure. In some embodiments, substrate 206 may include an n-type substrate, such as an n-type gallium arsenide (GaAs) substrate or indium phosphide (InP) substrate. In some embodiments, active regions 201 and 211 may include a MQW region.

Regions 203 and 213, 201 and 211, and 202 and 212 may be formed sequentially in an epitaxial growth process. For example, region 203 and 213 may be grown epitaxially over substrate 206, region 201 and 211 may be grown epitaxially over region 203 and 213, and region 202 and 212 may be grown epitaxially over region 201 and 211, respectively. After regions 201-203 and 211-213 are formed in the epitaxial growth process, a metal deposition process may be performed to form metal layers 207 and 216 on parts of regions 202 and 212, respectively. Metal layers 207 and 216, as contact metal, electrically contact p+ layers of the DBR structures and thus are electrically connected to top reflector regions 202 and 212, respectively. Then, a dielectric layer (not shown) with a material, such as silicon nitride or silicon oxide, may be deposited. For example, the dielectric layer may be formed on metal layers 207 and 216 and parts of region 202 and 212 that are not covered by metal layers 207 and 216.

Thereafter, a selective etch process, such as a selective dry etch or dry and wet etch processes, may be performed to form an opening (not shown) that separates VCSELs 1-9 of array 200. In some embodiments, the opening may extend vertically through top reflector regions 202 and 212, active regions 201 and 211, and at least partially through bottom reflector regions 203 and 213. The selective etch process exposes sides of an aluminum (Al)-rich or relatively high Al-content layer that is arranged adjacent to active region 201 or 211.

Then, a wet oxidation process may be performed to oxidize the Al-rich layer and form oxide layers 204 and 214. Oxide layers 204 and 214 are arranged to form oxide apertures 205 and 215, respectively. A laser output beam of each VCSEL emitter is aligned with oxide aperture 205 or 215. As shown in FIG. 2B, top reflector region 202, oxide aperture 205, active region 201, and bottom reflector 203 form an optical cavity or laser cavity. Similarly, top reflector region 212, oxide aperture 215, active region 211, and bottom reflector 213 also form an optical cavity or laser cavity. An oxide aperture such as oxide aperture 205 or 215 not only serves to form the laser cavity, but also to direct electrical currents through the central region of the cavity.

After oxide layers 204 and 214 and oxide apertures 205 and 215 are formed, the opening may be filled with a dielectric material (e.g., silicon oxide and/or silicon nitride) to form an isolation region 209. Isolation region 209 may extend vertically through top reflector regions 202 and 212, active regions 201 and 211, and at least partially through bottom reflector regions 203 and 213.

Thereafter, other fabrication processes (e.g., processes to form pad metal layers that are connected to metal layers 207 and 216) are performed to complete fabrication of VCSEL array 200. For example, on the bottom surface of substrate 206, a metal layer 208 may be deposited. Metal layers 207 and 216 serve as the anode of VCSEL array 200, and metal layer 208 serves as the cathode of array 200.

As described above, some dimensions of VCSEL 5 may be larger than those of VCSEL 1-4 and 6-9. In some embodiments, as shown in FIG. 2A, metal layers 207 and 216 may have a ring shape. The area of metal layer 207 may be larger than the area of metal layer 216. In addition, region 202 may be larger than region 212, and oxide aperture 205 may be larger than oxide aperture 215. As such, the series electrical resistance of VCSEL 5 may be the smallest in array 200.

Because VCSELs 1-9 are electrically coupled in parallel and VCSEL 5 has the smallest series resistance, VCSEL 5 has the largest input current and thus the largest output power. VCSEL 5's output decrease the most in operation since VCSEL 5 is at the center of array 200 and experiences the highest temperature among the VCSELs of array 200. VCSEL 5 may be configured such that it has the output power that has a similar level to that of other VCSELs in array 200 after the output power of VCSEL 5 decreases due to elevated temperature in operation. Hence the intensity uniformity of array 200 may be improved by configuring VCSELs with different dimensions.

Figure 3A:
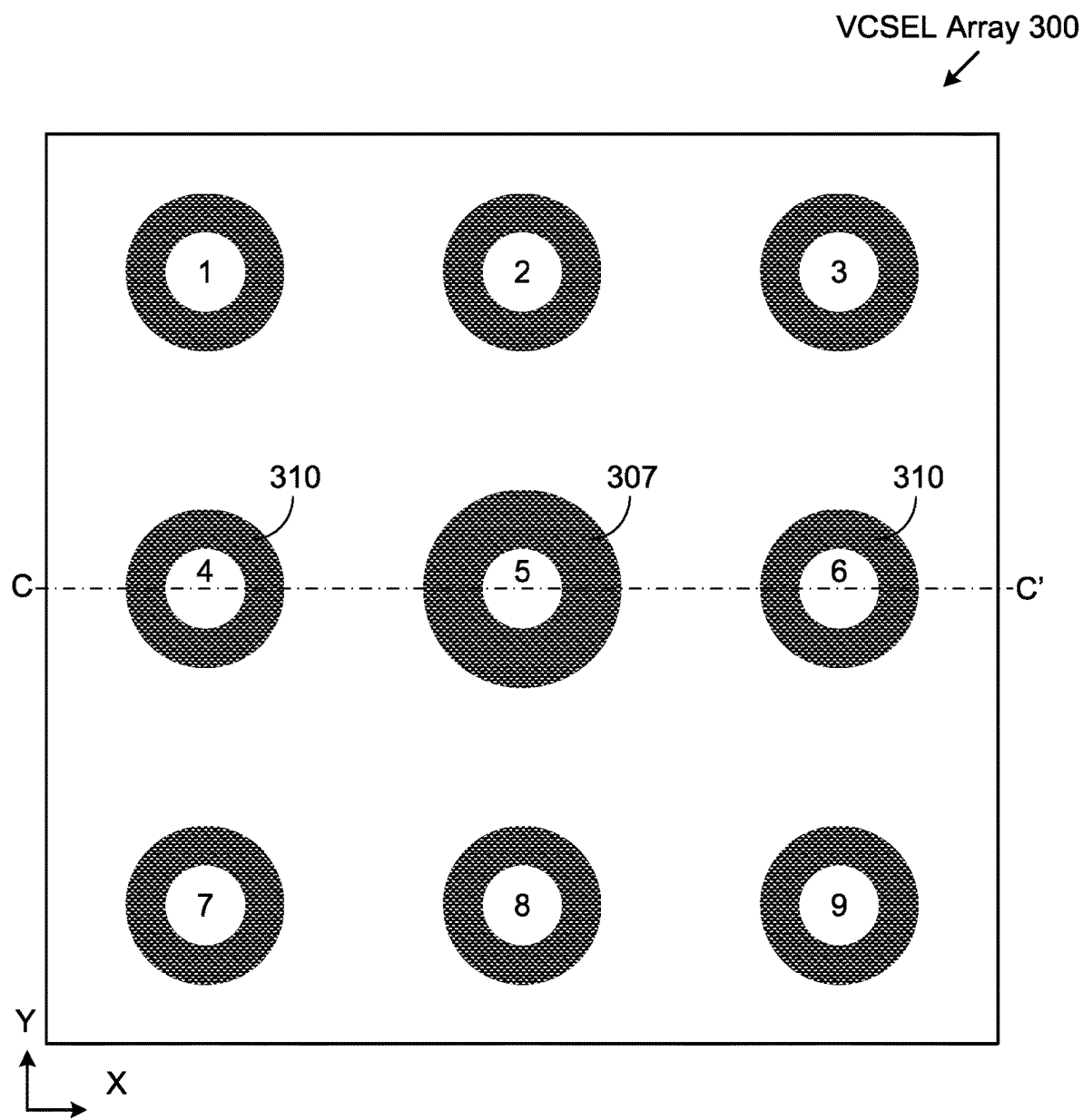
FIGS. 3A and 3B schematically illustrate a top view and a cross-sectional view of a VCSEL array, according to another embodiment of the present invention, FIG. 4 schematically illustrates a top view a VCSEL array, according to another embodiment of the present invention.
Figure 3B:
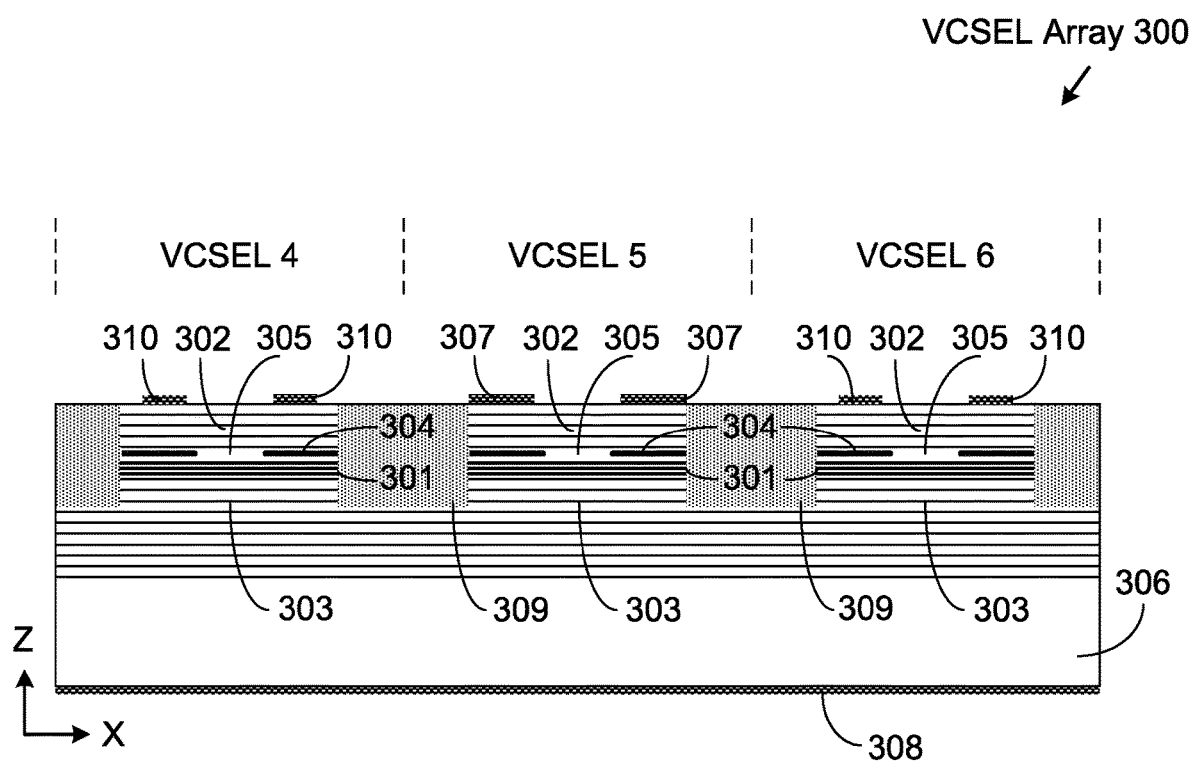

FIGS. 3A and 3B schematically illustrate a VCSEL array 300 according to another embodiment of the present invention. FIG. 3A shows a top view, while FIG. 3B shows a cross-sectional view along a line CC' of FIG. 3A. As shown in FIGS. 3A and 3B, array 300 may include VCSELs 1-9. VCSEL 5 is at the center of the array and surrounded by VCSELs 1-4 and 6-9. VCSELs 1-9 may include an active region 301, a top reflector region 302, a bottom reflector region 303, and an oxide layer 304 that forms an oxide aperture 305. Regions 301-303 each may include multiple layers that are grown epitaxially over a substrate 306. Top reflector region 302 may include a conductive p-type DBR structure. Bottom reflector region 303 may include a conductive n-type DBR structure. In some embodiments, substrate 306 may include an n-type substrate, such as an n-type GaAs substrate or InP substrate. In some embodiments, active region 301 may include a MQW region.

Regions 303, 301, and 302 may be formed sequentially in an epitaxial growth process. For example, region 303 may be grown epitaxially over substrate 306, region 301 may be grown epitaxially over region 303, and region 302 may be grown epitaxially over region 301. After regions 301-303 are formed in the epitaxial growth process, a metal deposition process may be performed to form metal layers 307 and 310 on parts of regions 302. The area of layer 307 is configured larger than the area of layer 310. Metal layer 307 is deposited over region 302 of VCSEL 5, and metal layers 310 are deposited over regions 302 of VCSELs 1-4 and 6-9, respectively. Thus, metal layers 307 and 310, as contact metal, electrically contact p+ layers of the DBR structures and are electrically connected to top reflector regions 302, respectively. Then, a dielectric layer (not shown) with a dielectric material (e.g., silicon nitride or silicon oxide) may be deposited. For example, the dielectric layer may be formed on metal layers 307 and 310 and parts of region 302 that are not covered by metal layers 307 and 310.

Thereafter, a selective etch process, such as a selective dry etch or dry and wet etch processes, may be performed to form an opening (not shown) that separates VCSELs 1-9 of array 300. In some embodiments, the opening may extend vertically through top reflector region 302, active region 301, and at least partially through bottom reflector region 303. The selective etch process exposes sides of an Al-rich layer that is arranged adjacent to active region 301.

Next, a wet oxidation process may be performed to oxidize the Al-rich layer and form oxide layers 304. Oxide layers 304 are arranged to form oxide apertures 305 for the VCSELs. A laser output beam of each VCSEL is aligned with one of oxide apertures 305.

After oxide layers 304 and oxide apertures 305 are formed, the opening may be filled with a dielectric material (e.g., silicon oxide and/or silicon nitride) to form an isolation region 309. Isolation region 309 may extend vertically through top reflector region 302, active region 301, and at least partially through bottom reflector region 303.

Thereafter, other fabrication processes (e.g., processes to form pad metal layers that are connected to metal layers 307 and 310) are performed to complete fabrication of VCSEL array 300. For example, on the bottom surface of substrate 306, a metal layer 308 may be deposited. Metal layers 307 and 310 may serve as the anode of VCSEL array 300, and metal layer 308 may serve as the cathode of array 300.

As described above, metal layer 307 is larger than metal layer 310 and other dimensions of VCSELs 1-9, such as the dimensions of top reflector region 302 and oxide aperture 305, are the same. As shown in FIG. 2A, metal layers 307 and 310 may have a ring shape with the same inner diameter. As layer 307 has a larger outer diameter, the area of metal layer 307 is larger than that of layer 310. As such, compared to VCSELs 1-4 and 6-9, the series resistance of VCSEL 5 may be smaller.

Because VCSELs 1-9 of array 300 are electrically coupled in parallel and VCSEL 5 has the smallest series electrical resistance, VCSEL 5 has the largest input current and thus the largest output power. VCSEL 5's output power may decrease the most in operation since VCSEL 5 is at the center of array 300 and experiences the highest temperature among the VCSELs of array 300. VCSEL 5 may be configured such that it has the output power that has a similar level to that of other VCSELs in array 300 after the output power of VCSEL 5 decreases due to elevated temperature in operation. Hence the intensity uniformity of array 300 may be improved by making metal layer 307 larger than metal layer 310.

Figure 4:
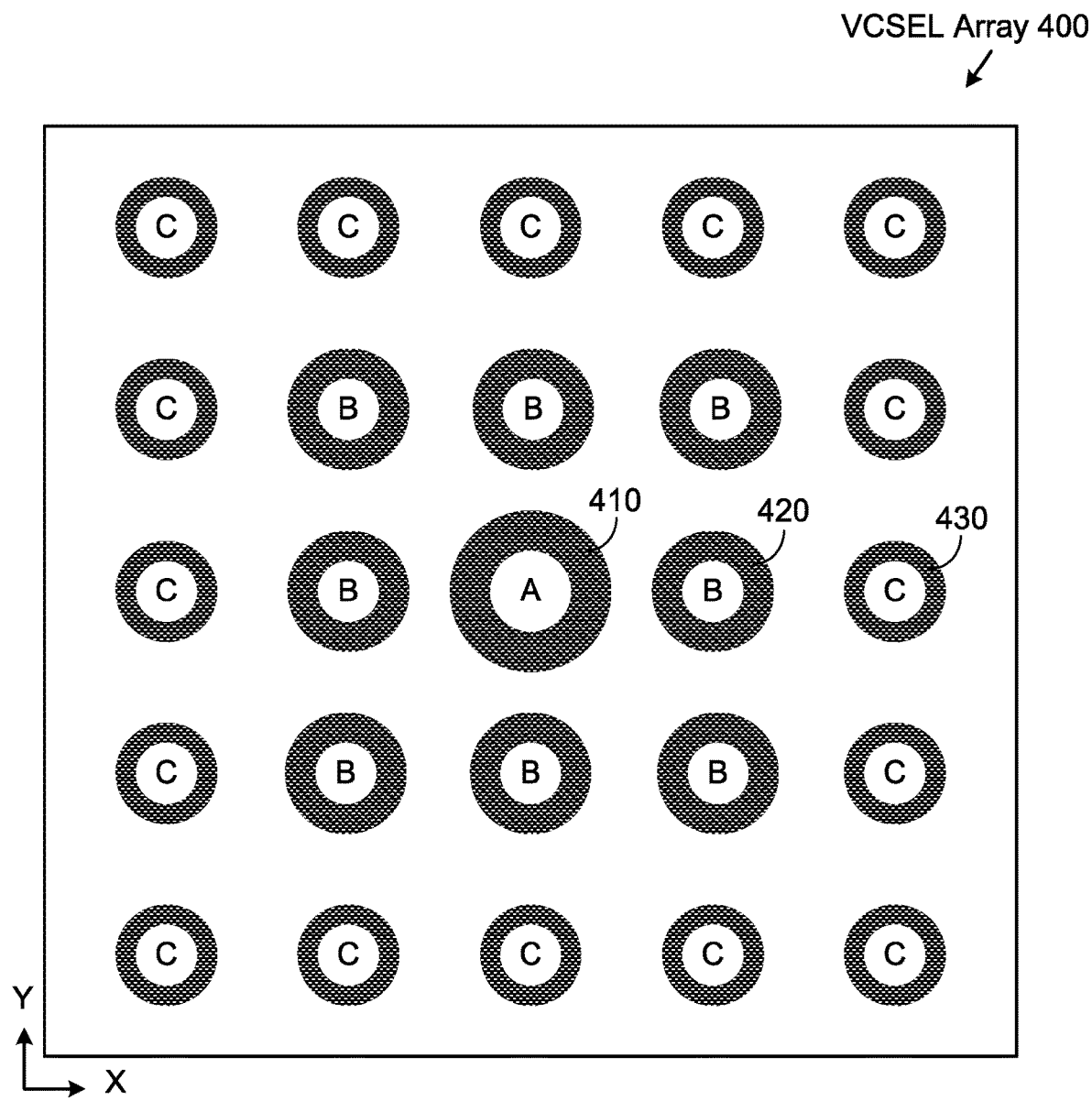

FIG. 4 schematically illustrate a VCSEL array 400 in a top view according to another embodiment of the present invention. Compared to VCSEL array 300 shown in FIGS. 3A and 3B, array 400 has more VCSEL emitters. As shown in FIG. 4, array 400 may include a VCSEL A at the center of array 400, VCSELs B that surround VCSEL A, and VCSELs C that surround the area of VCSEL B. Thus, VCSELs B are between the center and the edge regions of the array and VCSELs C are in the edge regions. As VCSEL A is in the central region of array 400, the temperature of VCSEL A may be the highest among the VCSELs during operation of array 400. As VCSELs B are positioned between the array center and the edge regions, the temperature of VCSEL B may be lower than that of VCSEL A, but higher than that of VCSEL C during operation.

Similar to the VCSELs of array 300, the VCSELs of array 400 may include an active region, a top reflector region, a bottom reflector region, and an oxide layer that forms an oxide aperture. The top and bottom reflector regions may include a conductive p-type DBR structure and a conductive n-type DBR structure, respectively. The active region may include a MQW region.

Similar to the fabrication process of VCSEL array 300, a metal deposition process may be performed to form metal layers 410, 420, and 430 as contact metal over parts of the top reflector regions, Metal layer 410 is deposited over the region of VCSEL A, metal layers 420 are deposited over the regions of VCSEL B, and metal layers 420 are deposited over the regions of VCSELs C. Metal layer 410, 420, and 430 electrically contact p+ layers of the DBR structures and are electrically connected to the top reflector regions of array 400, respectively.

As shown in FIG. 4, the area of layer 410 is configured larger than the area of layer 420, and the area of layer 420 is configured larger than the area of layer 430. VCSELs A, B, and C may have the same dimensions but the areas of metal layers 410, 420, and 430. Thus, the series resistance of VCSEL A is the smallest, the series resistance of VCSEL B is larger than that of VCSEL A but smaller than that of VCSEL C, and the series resistance of VCSEL C is the largest.

VCSELs A, B and C of array 400 are electrically coupled in parallel. As VCSEL A has the smallest series resistance, VCSEL A has the largest input current and thus the largest output power. VCSEL C has the largest series resistance, and thus the smallest output power. The output power of VCSEL B is smaller than that of VCSEL A and larger than that of VCSEL C, During operation of array 400, VCSEL A's output power may decrease the most since VCSEL A is at the center of array 400 and experiences the highest temperature in array 400. VCSEL A may be configured such that it has the output power that has a similar level to that of VCSEL C of array 400 after the output power of VCSEL A decreases due to elevated temperature in operation. Similarly, VCSEL B may be configured such that it has the output power that has a similar level to that of VCSEL C of array 400 after the output power of VCSEL B decreases due to elevated temperature in operation. Hence, the intensity uniformity of array 400 may be improved by configuring VCSELs with different sizes of the metal layer. For example, when a VCSEL is closer to the center of array 400 than another VCSEL, the metal layer of the VCSEL may be configured larger than that of the other VCSEL.

Figure 5A:
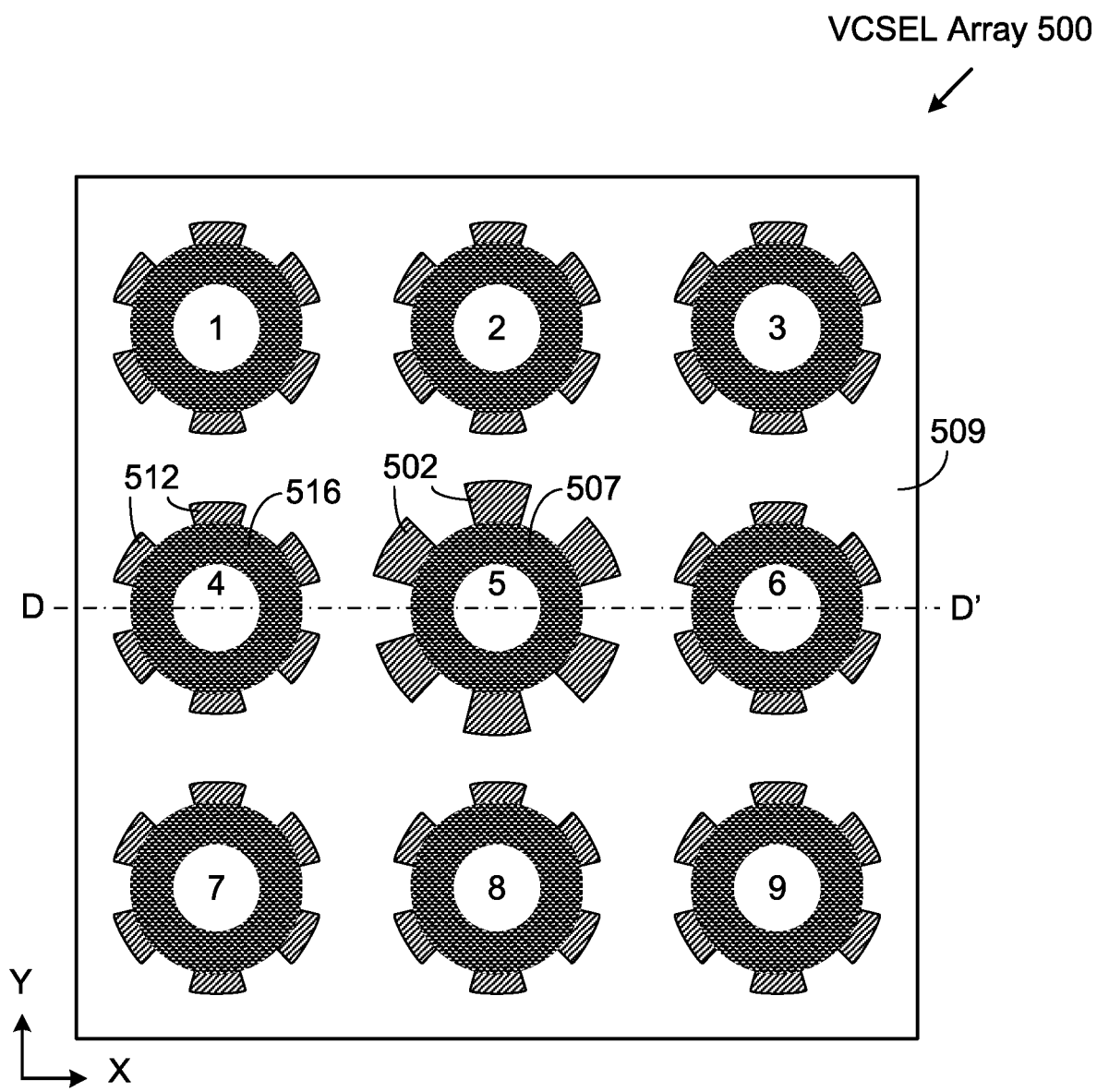
FIGS. 5A and 5B schematically illustrate a top view and a cross-sectional view of a VCSEL array, according to another embodiment of the present invention.
Figure 5B:
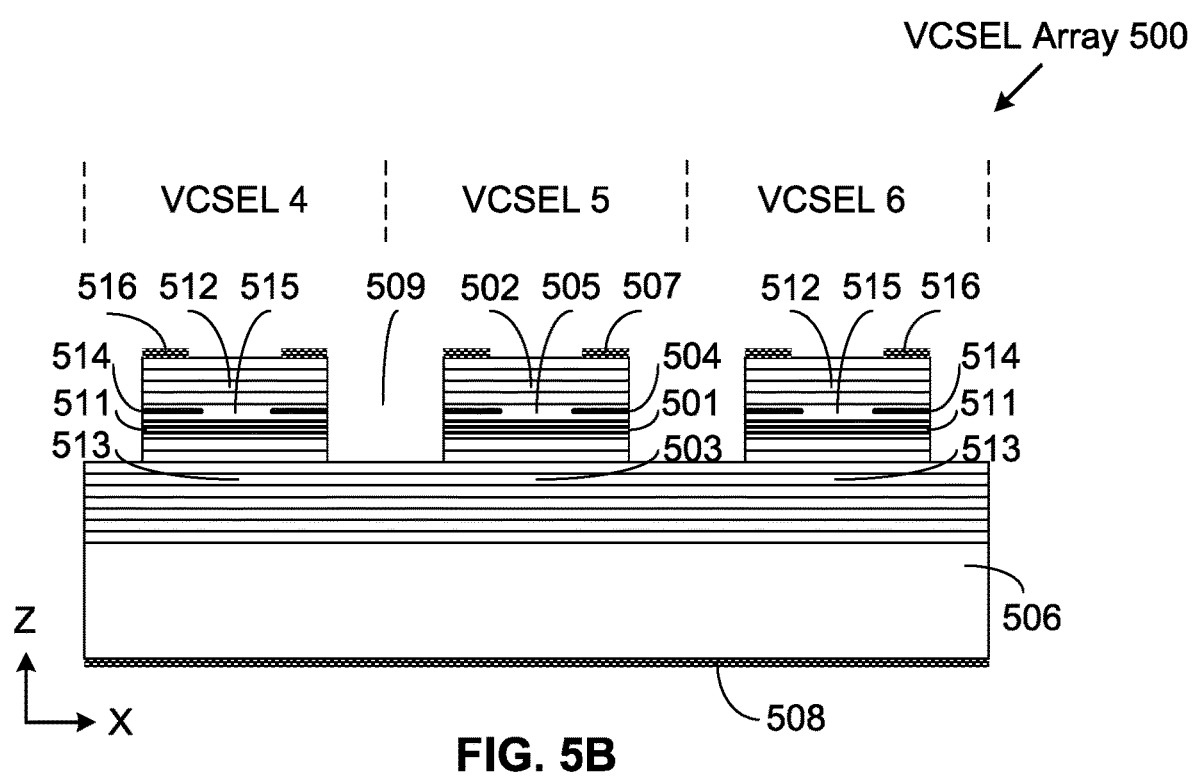

FIGS. 5A and 5B schematically illustrate a VCSEL array 500 according to another embodiment of the present invention. FIG. 5A shows a top view, while FIG. 5B shows a cross-sectional view along a line DD' of FIG. 5A. As shown in FIGS. 5A and 5B, array 500 may include VCSELs 1-9. VCSEL 5 is at the center of array 500 and surrounded by VCSELs 1-4 and 6-9. VCSEL 5 may include an active region 501, a top reflector region 502, a bottom reflector region 503, and an oxide layer 504 that forms an oxide aperture 505. VCSELs 1-4 and 6-9 may include an active region 511, a top reflector region 512, a bottom reflector region 513, and an oxide layer 514 that forms an oxide aperture 515. Regions 501-503 and 511-513 each include multiple layers that are grown epitaxially over a substrate 506. Top reflector regions 502 and 512 may include a conductive p-type DBR structure. Bottom reflector regions 503 and 513 may include a conductive n-type DBR structure. In some embodiments, substrate 506 may include an n-type substrate, such as an n-type GaAs substrate or TnP substrate. In some embodiments, active regions 501 and 511 may include a MQW region.

Regions 503 and 513, 501 and 511, and 502 and 512 may be formed sequentially in an epitaxial growth process. After regions 501-503 and 511-513 are formed in the epitaxial growth process, a metal deposition process may be performed to form metal layers 507 and 516 on parts of regions 502 and 512. Layers 507 and 516 may be configured to have the same shape with the same dimensions. Metal layer 507 is deposited over region 502 of VCSEL 5, and metal layers 516 are deposited over regions 512 of VCSELs 1-4 and 6-9, respectively. Thus, metal layers 507 and 516 electrically contact p+ layers of the DBR structures and are electrically connected to top reflector regions 502 and 512, respectively. Then, a dielectric layer (not shown) with a dielectric material (e.g., silicon nitride or silicon oxide) may be deposited. For example, the dielectric layer may be deposited on metal layers 507 and 516 and parts of regions 502 and 512 that are not covered by metal layers 507 and 516.

Thereafter, a selective etch process, such as a selective dry etch or dry and wet etch processes, may be performed to form an opening 509 that separates VCSELs 1-9 of array 500. In some embodiments, the opening 509 may extend vertically through top reflector regions 502 and 512, active regions 501 and 511, and at least partially through bottom reflector regions 503 and 513.

As shown in FIGS. 5A and 5B, the selective etch process forms top reflector regions 502 and 512 which have a gear shape in the X-Y plane, i.e., a plane parallel to substrate 506. The gear tooth of region 502 is configured larger than that of region 512. As such, the area of region 502 is larger than the area of region 512. To some extent, the area of region 503 is also larger than the area of region 513.

The selective etch process exposes sides of an Al-rich layer that is arranged adjacent to active regions 501 and 511. Next, a wet oxidation process may be performed to oxidize the Al-rich layer and form oxide layers 504 and 514. Oxide layers 504 and 514 are used to form oxide apertures 505 and 515 for the VCSELs. Oxide apertures 505 and 515 are configured to have the same dimensions. A laser output beam of each VCSEL is aligned with one of oxide apertures 505 and 515.

As the oxide apertures and metal layers 507 and 516 of VCSELs 1-9 have the same dimensions, VCSEL 5 has the smallest series resistance because top reflector region 502 is larger than top reflector region 512. Similar to arrays 200, 300, and 400, the series resistance difference may be used to improve intensity uniformity of VCSEL array 500.

In some embodiments, after oxide layers 504 and 514 and oxide apertures 505 and 515 are formed, opening 509 may be filled with a dielectric material (e.g., silicon oxide and/or silicon nitride). Then, other fabrication processes are performed to complete fabrication of VCSEL array 500. For example, on the bottom surface of substrate 506, a metal layer 508 may be deposited. Metal layers 507 and 516 may serve as the anode of VCSEL array 500, and metal layer 508 may serve as the cathode of array 500.

As described above, the series resistance of VCSEL 5 is the smallest among the VCSELs of array 500. Because VCSELs 1-9 of array 500 are electrically coupled in parallel and VCSEL 5 has the smallest series resistance, VCSEL 5 has the largest input current and thus the largest output power. VCSEL 5's output power may decrease the most in operation since VCSEL 5 is at the center of array 500 and experiences the highest temperature among the VCSELs. Thus, VCSEL 5 may be configured such that it has the output power that has a similar level to that of other VCSELs in array 500 after the output power of VCSEL 5 decreases due to elevated temperature in operation. Hence the intensity uniformity of array 500 may be improved by configuring VCSELs with different top reflector regions.

In some embodiments, array 500 may include more than nine VCSELs. For example, array 500 may include some VCSELs in the central region of the array, some VCSELs in the edge regions, and some VCSELs between the central region and the edge regions. Then, a VCSEL of the array may be configured according to the distance between the VCSEL and the center of the array. If a VCSEL is closer to the array center than another VCSEL, the VCSEL may have a larger top reflector region and thus smaller series resistance than the other VCSEL. As such, the intensity uniformity of the array may be improved.

Figure 6A:
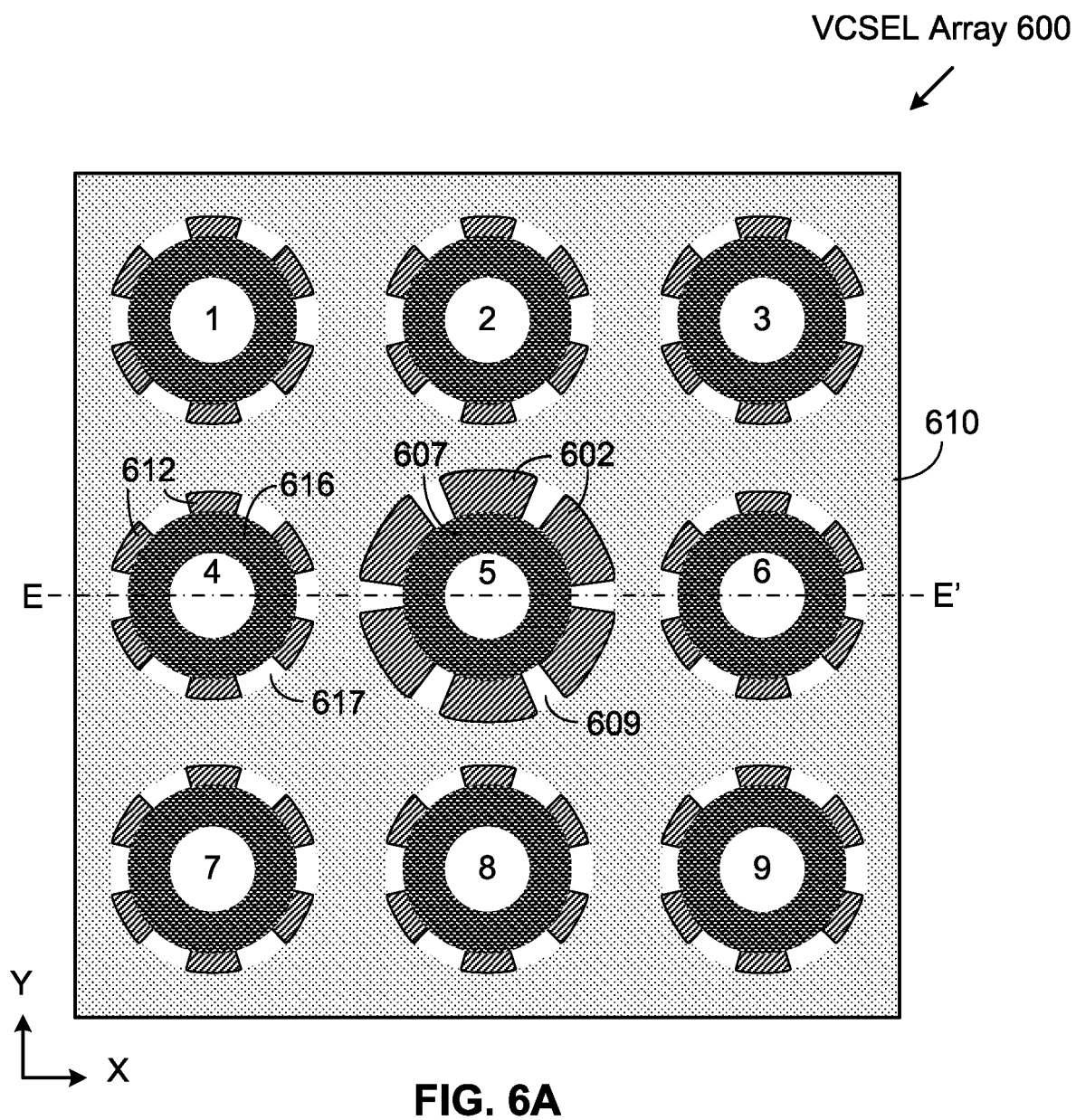
FIGS. 6A and 6B schematically illustrate a top view and a cross-sectional view of a VCSEL array, according to another embodiment of the present invention.
Figure 6B:
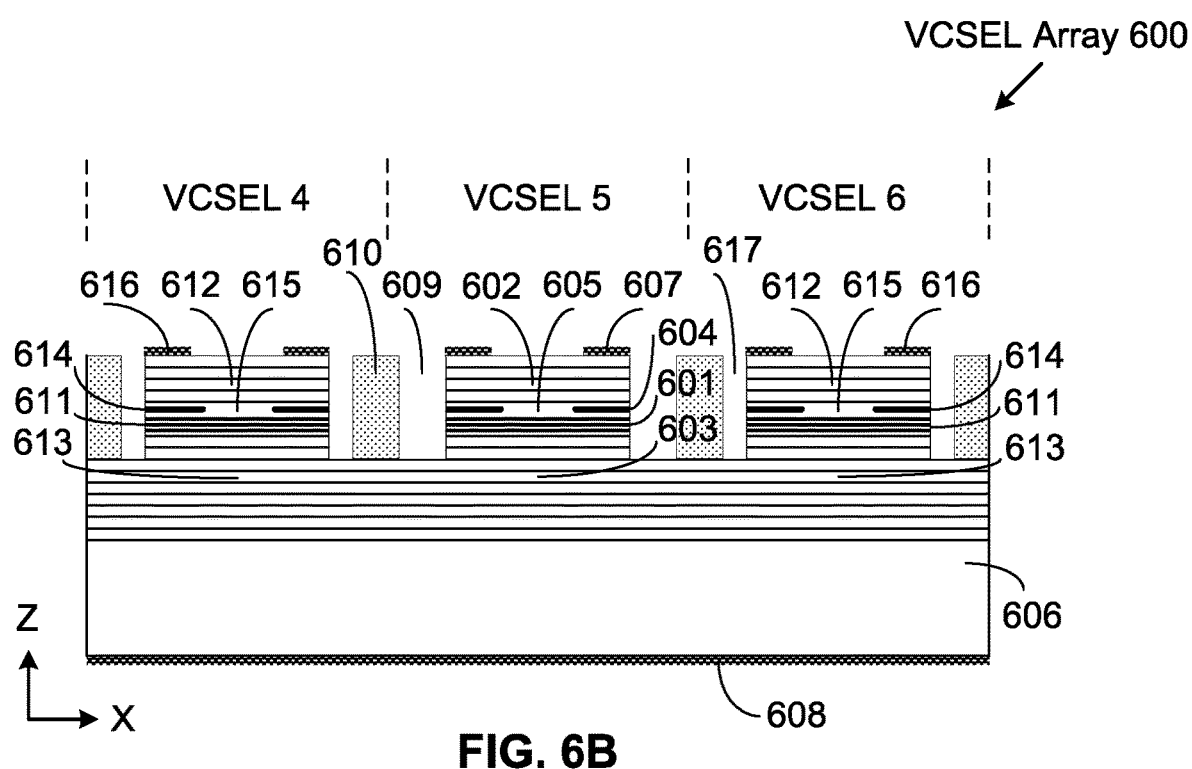

FIGS. 6A and 6B schematically illustrate a VCSEL array 600 according to another embodiment of the present invention. FIG. 6A shows a top view, while FIG. 6B shows a cross-sectional view along a line EE' of FIG. 6A. As shown in FIGS. 6A and 6B, array 600 may include VCSELs 1-9. VCSEL 5 is at the center of array 600 and surrounded by VCSELs 1-4 and 6-9. VCSEL 5 may include an active region 601, a top reflector region 602, a bottom reflector region 603, and an oxide layer 604 that forms an oxide aperture 605. VCSELs 1-4 and 6-9 may include an active region 611, a top reflector region 612, a bottom reflector region 613, and an oxide layer 614 that forms an oxide aperture 615. Regions 601-603 and 611-613 each include multiple layers that are grown epitaxially over a substrate 606. Top reflector regions 602 and 612 may include a conductive p-type DBR structure. Bottom reflector regions 603 and 613 may include a conductive n-type DBR structure. In some embodiments, substrate 606 may include an n-type substrate, such as an n-type GaAs substrate or InP substrate. In some embodiments, active regions 601 and 611 may include a MQW region.

Regions 603 and 613, 601 and 611, and 602 and 612 may be deposited sequentially in an epitaxial growth process. After regions 601-603 and 611-613 are formed in the epitaxial growth process, a metal deposition process may be performed to form metal layers 607 and 616 on parts of regions 602 and 612. Layers 607 and 616 may be configured to have the same shape with the same dimensions. Metal layer 607 is deposited over region 602 of VCSEL 5, and metal layers 616 are deposited over regions 612 of VCSELs 1-4 and 6-9, respectively. Thus, metal layers 607 and 616 electrically contact p+ layers of the DBR structures and are electrically connected to top reflector regions 602 and 612, respectively. Then, a dielectric layer (not shown) with a dielectric material (e.g., silicon nitride or silicon oxide) may be deposited. For example, the dielectric layer may be deposited on metal layers 607 and 616 and parts of regions 602 and 612 that are not covered by metal layers 607 and 616.

Thereafter, a selective etch process, such as a selective dry etch or dry and wet etch processes, may be performed to form openings 609 and 617 that surround VCSEL 5 and VCSELs 1-4 and 6-9, respectively. In some embodiments, openings 609 and 617 may extend vertically through top reflector regions 602 and 612, active regions 601 and 611, and bottom reflector regions 603 and 613, and reach substrate 606, in some embodiments, openings 609 and 617 may extend through top reflector regions 602 and 612, active regions 601 and 611, and partially through bottom reflector regions 603 and 613.

The selective etch process exposes sides of an Al-rich layer that is arranged adjacent to active regions 601 and 611. Next, a wet oxidation process may be performed to oxidize the Al-rich layer and form oxide layers 604 and 614. Oxide layers 604 and 614 are arranged to form oxide apertures 605 and 615 for the VCSELs. Oxide apertures 605 and 615 are configured to have the same or similar dimensions. A laser output beam of each VCSEL is aligned with one of oxide apertures 605 and 615.

After the wet oxidation process, an ion implantation process may be performed to form an ion implantation region 610, which serves as an isolation region to separate VCSELs 1-9 of array 600. As shown in FIGS. 6A and 6B, the selective etch and ion implantation processes form top reflector regions 602 and 612 that have a gear shape in the X-Y plane, i.e., a plane parallel to substrate 606. The gear tooth of region 602 is configured larger than that of region 612. As such, the area of region 602 is larger than the area of region 612. To certain extent, the area of region 603 is also larger than the area of region 613. In some embodiments, the ion implantation process may be performed before the selective etch process is implemented.

As metal layers 607 and 616 of VCSELs 1-9 have the same dimensions, and the oxide apertures have the same or similar dimensions, VCSEL 5 has the smallest series resistance because top reflector region 602 is larger than top reflector region 612. Similar to arrays 200-500, the series resistance difference may be used to improve intensity uniformity of VCSEL array 600.

In some embodiments, after oxide layers 604 and 614 and oxide apertures 605 and 615 are formed, openings 609 and 617 may be filled with a dielectric material. Then, other fabrication processes are performed to complete fabrication of VCSEL array 600. For example, on the bottom surface of substrate 606, a metal layer 608 may be deposited. Metal layers 607 and 616 may serve as the anode of VCSEL array 600, and metal layer 608 may serve as the cathode of array 600.

As described above, the series resistance of VCSEL 5 is the smallest among the VCSELs of array 600. Because VCSELs 1-9 of array 600 are electrically coupled in parallel and VCSEL 5 has the smallest series resistance, VCSEL 5 has the largest input current and thus the largest output power. VCSEL 5's output power may decrease the most in operation since VCSEL 5 is at the center of array 600 and experiences the largest temperature rise among the VCSELs. Thus, VCSEL 5 may be configured such that it has the output power that has a similar level to that of other VCSELs in array 600 after the output power of VCSEL 5 decreases due to the temperature rise in operation. Hence the intensity uniformity of array 600 may be improved by configuring VCSELs that have different top reflector regions.

In some embodiments, array 600 may include more than nine VCSELs. For example, there may be multiple VCSELs between a VCSEL at the center of array 600 and a VCSEL at the edge of the array. Then, a VCSEL of the array may be configured according to the distance between the VCSEL and the center of the array. If a VCSEL is closer to the array center than another VCSEL, the VCSEL may be configured to have a larger top reflector region and thus smaller series resistance than the other VCSEL. As such, the intensity uniformity of the array may be improved.

Figure 7A:
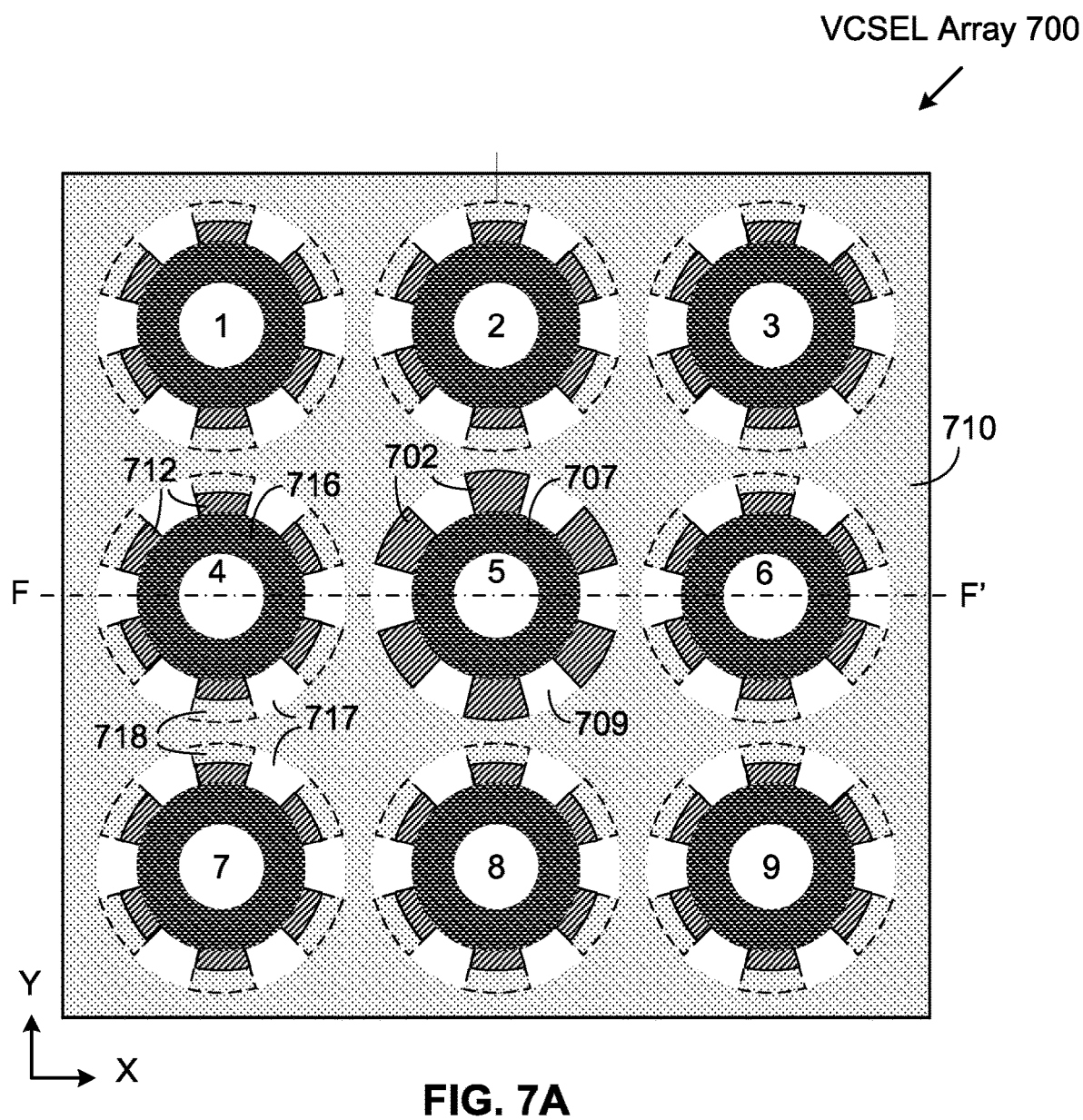
FIGS. 7A and 7B schematically illustrate a top view and a cross-sectional view of a VCSEL array, according to another embodiment of the present invention.
Figure 7B:
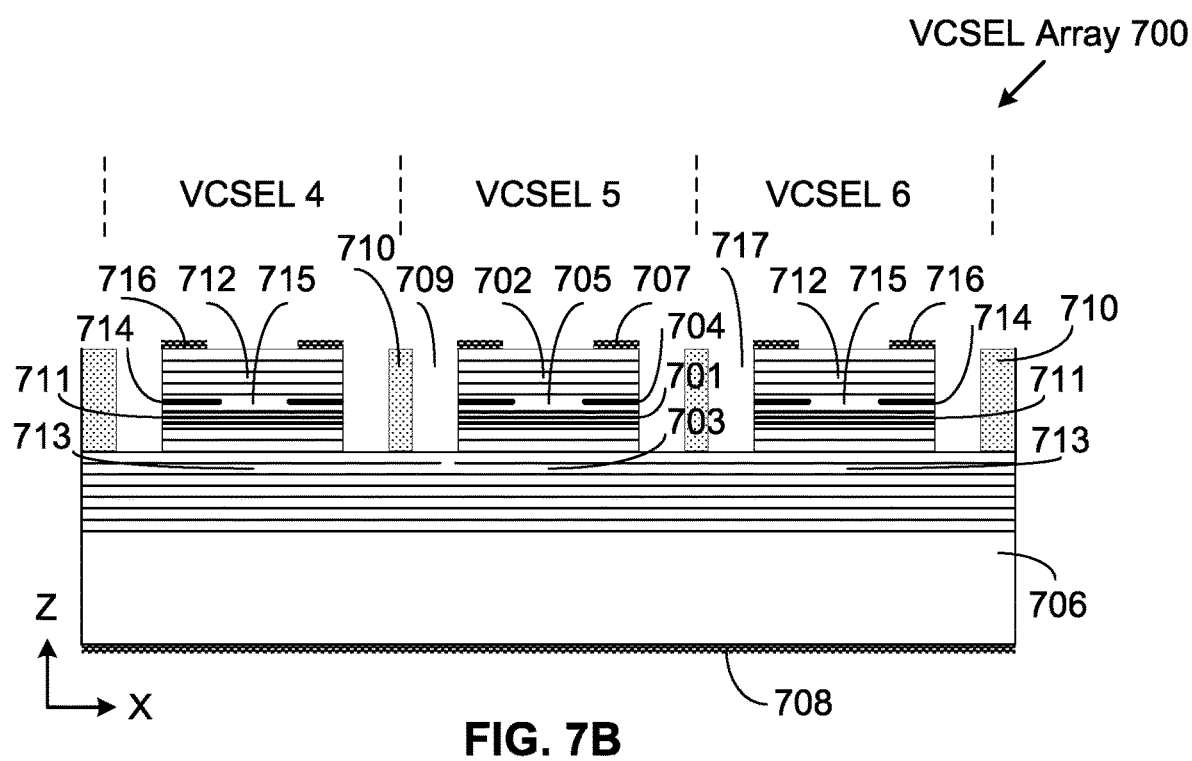

FIGS. 7A and 7B schematically illustrate a VCSEL array 700 according to another embodiment of the present invention. FIG. 7A shows a top view, while FIG. 7B shows a cross-sectional view along a line FF' of FIG. 7A. As shown in FIGS. 7A and 7B, array 700 may include VCSELs 1-9. VCSEL 5 is at the center of array 700 and surrounded by VCSELs 1-4 and 6-9. VCSEL 5 may include an active region 701, a top reflector region 702, a bottom reflector region 703, and an oxide layer 704 that forms an oxide aperture 705. VCSELs 1-4 and 6-9 may include an active region 711, a top reflector region 712, a bottom reflector region 713, and an oxide layer 714 that forms an oxide aperture 715. Regions 701-703 and 711-713 each include multiple layers that are grown epitaxially over a substrate 706. Top reflector regions 702 and 712 may include a conductive p-type DBR structure, Bottom reflector regions 703 and 713 may include a conductive n-type DBR structure. In some embodiments, substrate 706 may include an n-type substrate, such as an n-type GaAs substrate or InP substrate. In some embodiments, active regions 701 and 711 may include a MQW region.

Regions 703 and 713, 701 and 711, and 702 and 712 may be deposited sequentially in an epitaxial growth process. After regions 701-703 and 711-713 are formed in the epitaxial growth process, a metal deposition process may be performed to form metal layers 707 and 716 on parts of regions 702 and 712. Layers 707 and 716 may be configured to have the same shape with the same dimensions. Metal layer 707 is deposited over region 702 of VCSEL 5, and metal layers 716 are deposited over regions 712 of VCSELs 1-4 and 6-9, respectively. Thus, metal layers 707 and 716 electrically contact p+ layers of the DBR structures and are electrically connected to top reflector regions 702 and 712, respectively. Then, a dielectric layer (not shown) with a dielectric material (e.g., silicon nitride or silicon oxide) may be deposited. For example, the dielectric layer may be deposited to cover metal layers 707 and 716 and parts of regions 702 and 712 that are not blocked by metal layers 707 and 716.

Thereafter, a selective etch process, such as a selective dry etch or dry and wet etch processes, may be performed to form openings 709 and 717 that surround VCSEL 5 and VCSELs 1-4 and 6-9, respectively. In some embodiments, openings 709 and 717 may have the same dimensions and extend vertically through top reflector regions 702 and 712, active regions 701 and 711, and bottom reflector regions 703 and 713, and reach substrate 706. In some embodiments, openings 709 and 717 may extend through top reflector regions 702 and 712, active regions 701 and 711, and partially through bottom reflector regions 703 and 713.

The selective etch process exposes sides of an Al-rich layer that is arranged adjacent to active regions 701 and 711. Then, a wet oxidation process may be performed to oxidize the Al-rich layer and form oxide layers 704 and 714. Oxide layers 704 and 714 are used to form oxide apertures 705 and 715 for the VCSELs. Oxide apertures 705 and 715 are configured to have the same dimensions. A laser output beam of each VCSEL is aligned with one of oxide apertures 705 and 715.

After the wet oxidation process, an ion implantation process may be performed to form ion implantation regions 710 and 718, which electrically isolate VCSELs 1-9 of array 700. As shown in FIGS. 7A and 7B, the selective etch and ion implantation processes form top reflector regions 702 and 712 that have a gear shape in the X-Y plane. The gear tooth of region 702 is configured larger than that of region 712 and the area of region 702 is larger than the area of region 712. Region 718 adjoins the gear tooth of region 712 and is used for reduction of region 712. To certain extent, the area of region 703 is also larger than the area of region 713. In some embodiments, the ion implantation process may be performed before the selective etch process is implemented.

As oxide apertures 705 and 715 and metal layers 707 and 716 of VCSELs 1-9 have the same dimensions, respectively, VCSEL 5 has the smallest series resistance because top reflector region 702 is larger than top reflector region 712, Similar to arrays 200-600, the series resistance difference may be used to improve intensity uniformity of VCSEL array 700.

In some embodiments, after oxide layers 704 and 714 and oxide apertures 705 and 715 are formed, openings 709 and 717 may be filled with a dielectric material. Then, other fabrication processes are performed to complete fabrication of VCSEL array 700. For example, on the bottom surface of substrate 706, a metal layer 708 may be deposited. Metal layers 707 and 716 may serve as the anode of VCSEL array 700, and metal layer 708 may serve as the cathode of array 700.

As described above, the series resistance of VCSEL 5 is the smallest among the VCSELs of array 700. Because VCSELs 1-9 of array 700 are electrically coupled in parallel and VCSEL 5 has the smallest series resistance, VCSEL 5 has the largest input current and thus the largest output power. VCSEL 5's output power may decrease the most in operation since VCSEL 5 is at the center of array 700 and experiences the largest temperature rise among the VCSELs of array 700. Thus, VCSEL 5 may be configured such that it has the output power that has a similar level to that of other VCSELs in array 700 after the output power of VCSEL 5 decreases due to the temperature rise in operation. Hence the intensity uniformity of array 700 may be improved by configuring different top reflector regions.

In some embodiments, array 700 may include more than nine VCSELs. For example, there may be multiple VCSELs between a VCSEL at the center of array 700 and a VCSEL at the edge of the array. Then, a VCSEL of the array may be configured according to the distance between the VCSEL and the center of the array. If a VCSEL is closer to the array center than another VCSEL, the VCSEL may have a larger top reflector region than the other VCSEL. As such, the intensity uniformity of the array may be improved.

Figure 8A:
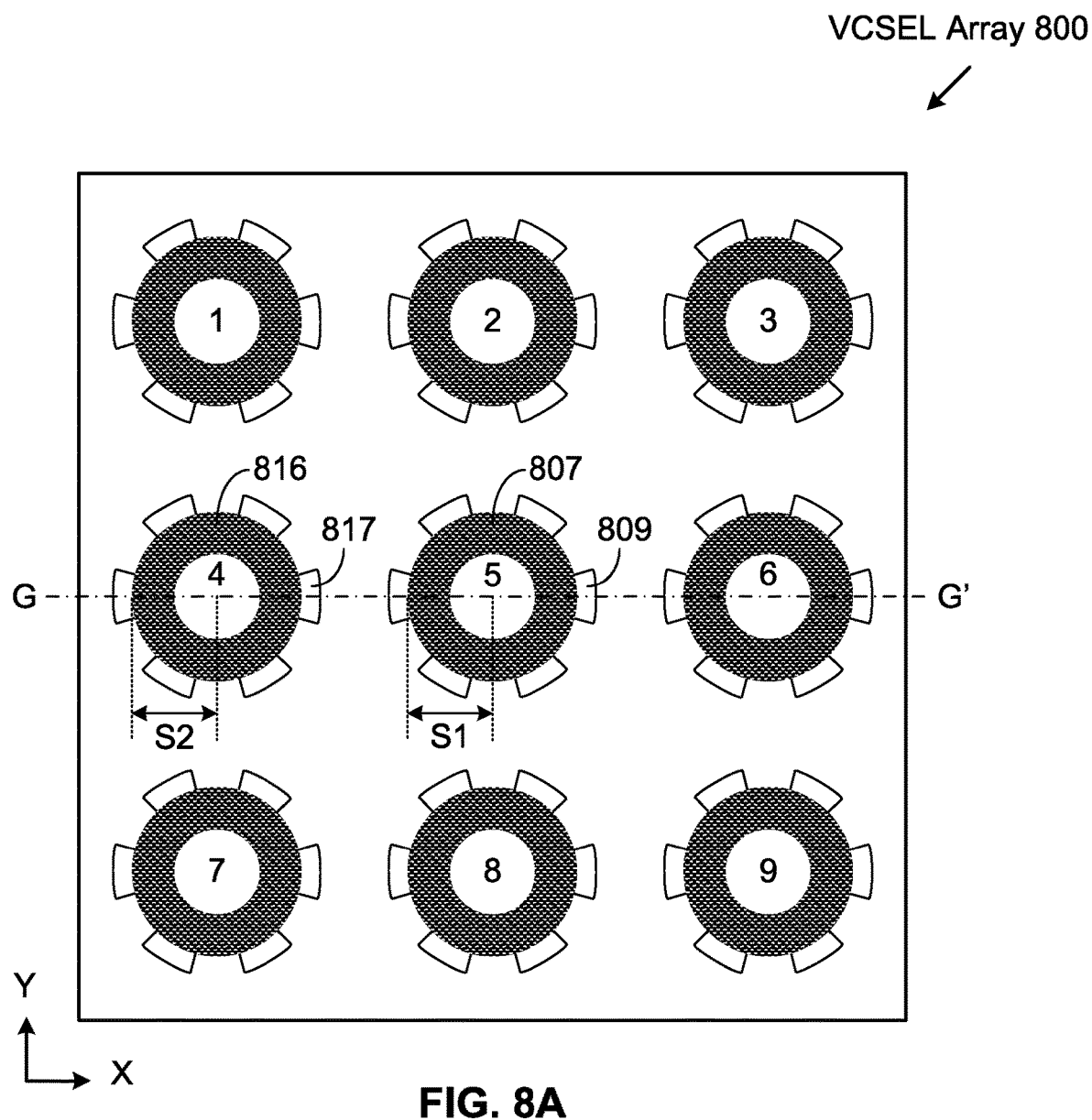
FIGS. 8A, 8B, and 8C schematically illustrate top and cross-sectional views of a VCSEL array, according to another embodiment of the present invention.
Figure 8B:
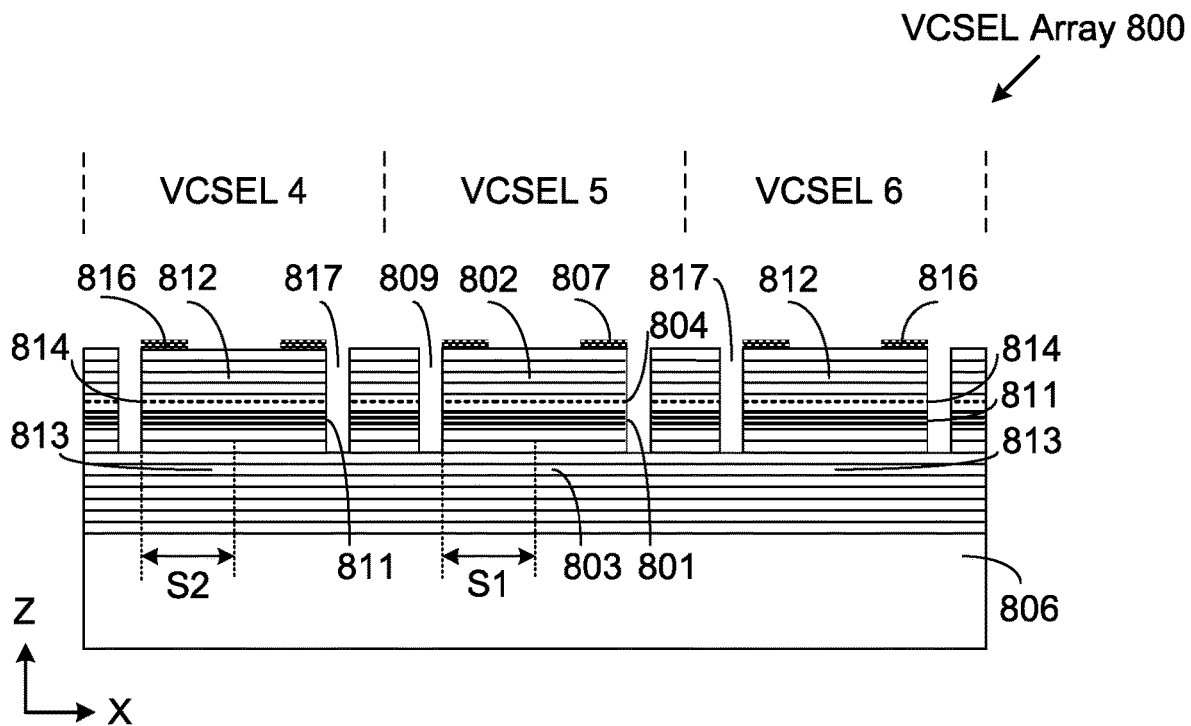
Figure 8C:
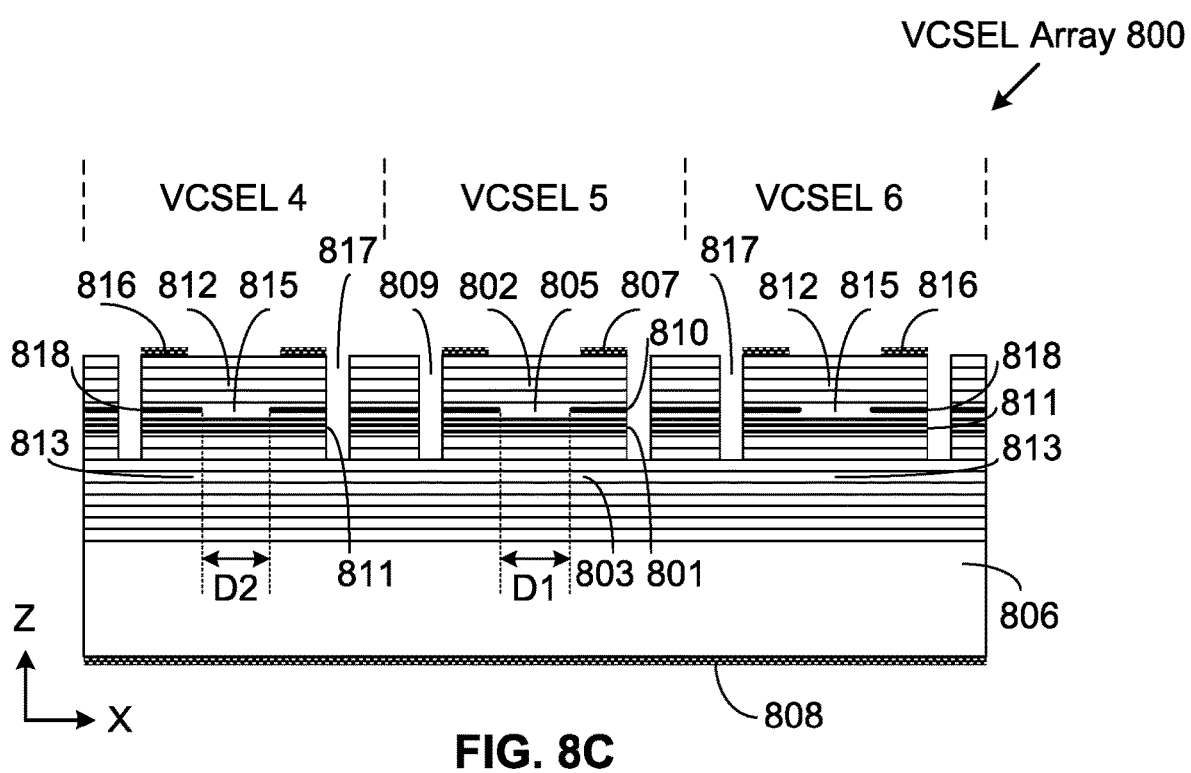

FIGS. 8A, 8B, and 8C schematically illustrate a VCSEL array 800 according to another embodiment of the present invention. FIG. 8A shows a top view in an X-Y plane, while FIGS. 8B and 8C show cross-sectional views along a line GG' of FIG. 8A in an X-Z plane. As shown in FIGS. 8A-8C, array 800 may include VCSELs 1-9. VCSEL 5 is in a central region of array 800 and surrounded by VCSELs 1-4 and 6-9. VCSEL 5 may include an active region 801, a top reflector region 802, a bottom reflector region 803, and an Al-rich layer 804. VCSELs 1-4 and 6-9 may include an active region 811, a top reflector region 812, a bottom reflector region 813, and an Al-rich layer 814. Al-rich layers 804 and 814 may include a single Al-rich layer or multiple Al-rich layers, and may be arranged proximate to active regions 801 and 811, respectively. In some embodiments, Al-rich layers 804 and 814 may be grown after active regions 801 and 811 are formed and arranged above the active layers, as shown in FIG. 8B. Alternatively, Al-rich layers 804 and 814 may be grown before active regions 801 and 811 are formed and arranged underneath the active regions. Regions 801-803 and 811-813 each include multiple layers that are grown epitaxially over a substrate 806. Top reflector regions 802 and 812 may include a conductive p-type DBR structure. Bottom reflector regions 803 and 813 may include a conductive n-type DBR structure. In some embodiments, substrate 806 may include an n-type substrate, such as an n-type GaAs substrate or InP substrate. In some embodiments, active regions 801 and 811 may include a MQW region.

Regions 803 and 813, 801 and 811, and 802 and 812 may be formed sequentially in an epitaxial growth process. After regions 801-803 and 811-813 are formed in the epitaxial growth process, a metal deposition process may be performed to form metal layers 807 and 816 on parts of regions 802 and 812. Metal layers 807 and 816 may be configured to have the same shape with the same dimensions. Metal layer 807 is deposited over region 802 of VCSEL 5, and metal layers 816 are deposited over regions 812 of VCSELs 1-4 and 6-9, respectively. Metal layers 807 and 816 electrically contact p+ layers of the DBR structures and are electrically connected to top reflector regions 802 and 812, respectively. Then, a dielectric layer (not shown) with a dielectric material (e.g., silicon nitride or silicon oxide) may be deposited. For example, the dielectric layer may be deposited over metal layers 807 and 816 and parts of regions 802 and 812 that are not covered by metal layers 807 and 816.

Thereafter, a selective etch process, such as a selective dry etch or dry and wet etch processes, may be performed to form openings 809 that surround VCSEL 5 and openings 817 that surround VCSELs 1-4 and 6-9 of array 800, respectively. In some embodiments, openings 809 and 817 may extend vertically through top reflector regions 802 and 812, active regions 801 and 811, and at least partially through bottom reflector regions 803 and 813. Optionally, openings 809 and 817 may contain pairs of openings and a pair of the openings may be symmetrical with respect to the center of a VCSEL structure in the X-Y plane, as shown in FIG. 8A.

As illustrated in FIGS. 8A-8B, openings 809 and 817 may have curved inner edges that face the center of a VCSEL structure and are concentric with respect to the center of the VCSEL structure. A distance between opening 809 and the center of VCSEL 5 is S1, and a distance between opening 817 and the center of anyone of VCSELs 1-5 and 6-9 is S2. Optionally, S1 or S2 may be the distance between the inner edge of opening 809 or 817 and the center of a corresponding VCSEL. In some embodiments, such as descriptions below, S1 may be arranged larger than S2.

The selective etch process exposes sides of Al-rich layers 804 and 814 in openings 809 and 817. Next, a wet oxidation process may be performed to partially oxidize Al-rich layers 804 and 814 and form oxide layers 810 and 818. Oxide layers 810 and 818 are generated around openings 809 and 817 initially, and then spread inwards to form oxide apertures 805 and 815 for the VCSELs, as shown in FIG. 8C. The lateral oxidation rate may be arranged uniform for Al-rich layers 804 and 814. As such, oxide apertures 805 and 815 may have a circular or circle-like shape. The diameter of an oxide aperture is determined by the value of S1 or S2, the lateral oxidation rate, and the time of oxidation. After the oxidation process is completed, remaining Al-rich layers are left in the oxide apertures. For simplicity, the remaining Al-rich layers are omitted in FIG. 8C. Let D1 and D2 be the diameter of oxide apertures 805 and 815, respectively. Because S1 is larger than S2, D1 is larger than D2. Further, areas of the active region, top reflector region, and bottom reflector region of VCSEL 5 may be arranged larger than those of VCSELs 1-4 and 6-9, respectively. Alternatively, areas of the active region, top reflector region, and bottom reflector region of VCSELs 1-9 may be arranged the same or similar, respectively. In descriptions below, as an example, areas of the active region, top reflector region, and bottom reflector region of VCSEL 5 are larger than those of VCSELs 1-4 and 6-9, respectively. Laser output beams of the VCSELs are aligned with oxide apertures 805 and 815, respectively.

As metal layers 807 and 816 of VCSELs 1-9 have the same dimensions, VCSEL 5 may have the smallest series resistance in VCSEL array 800 because its oxide aperture, active region, top reflector region, and bottom reflector region are the largest. Similar to the VCSEL arrays illustrated above, the series resistance difference may be used to improve intensity uniformity of VCSEL array 800.

In some embodiments, after oxide layers 810 and 818 and oxide apertures 805 and 815 are formed, openings 809 and 817 may be filled with a dielectric material (e.g., silicon oxide and/or silicon nitride). Then, other fabrication processes may be performed to complete fabrication of VCSEL array 800. For example, isolation trenches or isolation regions may be formed to surround and isolate each VCSEL. On the bottom surface of substrate 806, a metal layer 808 may be deposited. Metal layers 807 and 816 may serve as the anode of VCSEL array 800, and metal layer 808 may serve as the cathode of the array.

As described above, the series resistance of VCSEL 5 is the smallest among the VCSELs of array 800. Because VCSELs 1-9 of array 800 are electrically coupled in parallel and VCSEL 5 has the smallest series resistance, VCSEL 5 may have the largest input current and thus the largest output power. VCSEL 5's output power may decrease the most in operation since VCSEL 5 is in the central region of array 800 and experiences the highest temperature among the VCSELs. Thus, VCSEL 5 may be configured such that it has the output power that has a similar level to that of other VCSELs in array 800 after the output power of VCSEL 5 decreases due to elevated temperature in operation. Hence the intensity uniformity of array 800 may be improved by configuring VCSELs with different oxide apertures.

In some embodiments, dimensions of oxide apertures of a VCSEL array may be adjusted individually using the output power of each VCSEL. Take VCSEL array 800 for example. Let P1 be the output power of VCSEL 5, and P2 be the individual output power of VCSELs 1-4 and 6-9. Assuming that D1 and D2 have the same value D0 initially. Since VCSEL 5 is in the central region of the array, the temperature of VCSEL 5 is higher than other VCSELs after VCSEL array 800 is in operation for a predetermined time. As such, P1 may become smaller than P2, which may cause an issue of intensity uniformity. The intensity uniformity of VCSEL array 800 may be improved by adjusting D1 and/or D2. For example, D2 may be reduced to reduce P2. Alternatively, D1 may be enlarged to increase P1, which may achieve better intensity uniformity as well.

Optionally, adjustment factor V may be calculated. For VCSEL array 800, V may equal to the square root of P2 divided by P1. That is, V=SQRT (P2/P1). Then, in some cases, we may let D1=D0, and D2=D0/V. As P1 is smaller than P2, V is larger than 1. Hence, the value of D1 remains unchanged, while D2 is reduced after being divided by V. Alternatively, in some other cases, we may have D1=D0*V, while D2=D0. That is, the value of D1 is increased after being multiplied by V, while the value of D2 remains unchanged. In both scenarios, the ratio of D1 to D2 is increased to improve the intensity uniformity of VCSEL array 800. After values of D1 and D2 are determined, values of S1 and S2 may be calculated. Then, oxide apertures with diameters D1 and D2 may be formed using S1, S2, the lateral oxidation rate, and a calculated oxidation time.

Figure 9A:
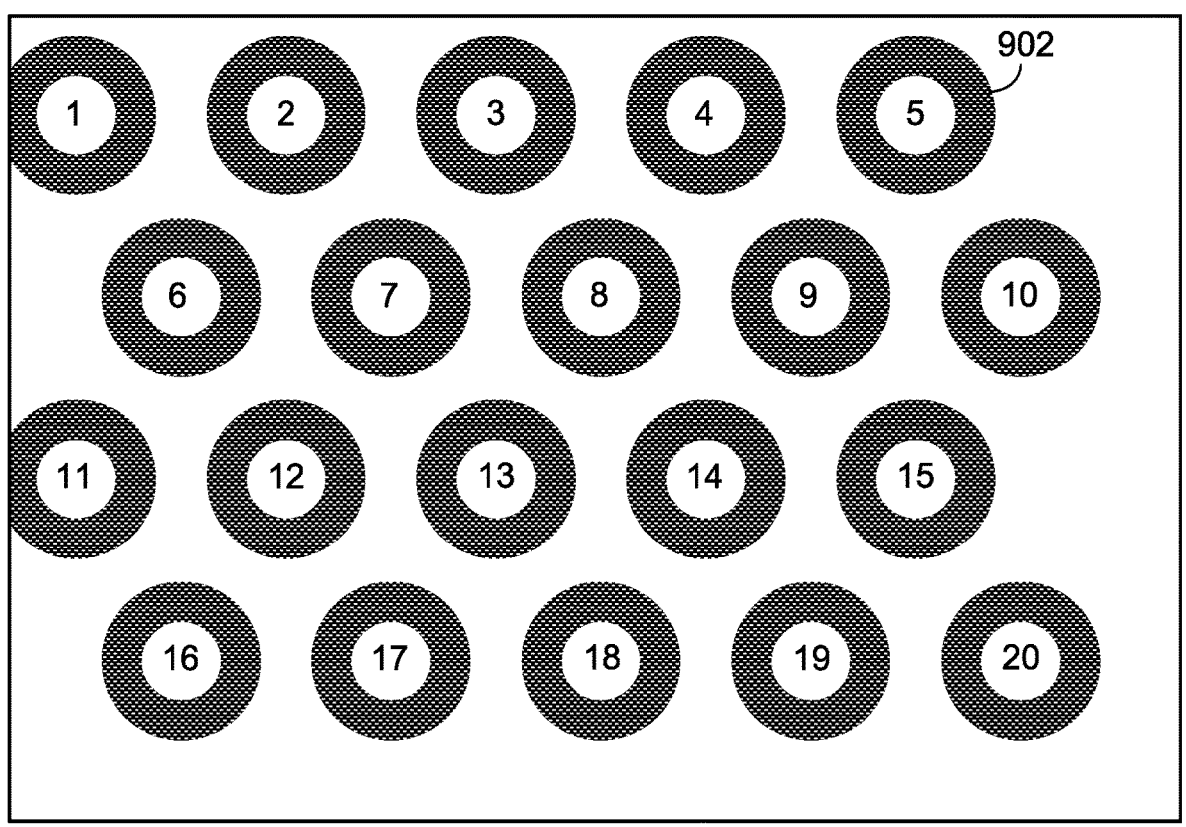
FIGS. 9A, 9B, and 9C schematically illustrate top views of a VCSEL array, according to another embodiment of the present invention.
Figure 9B:
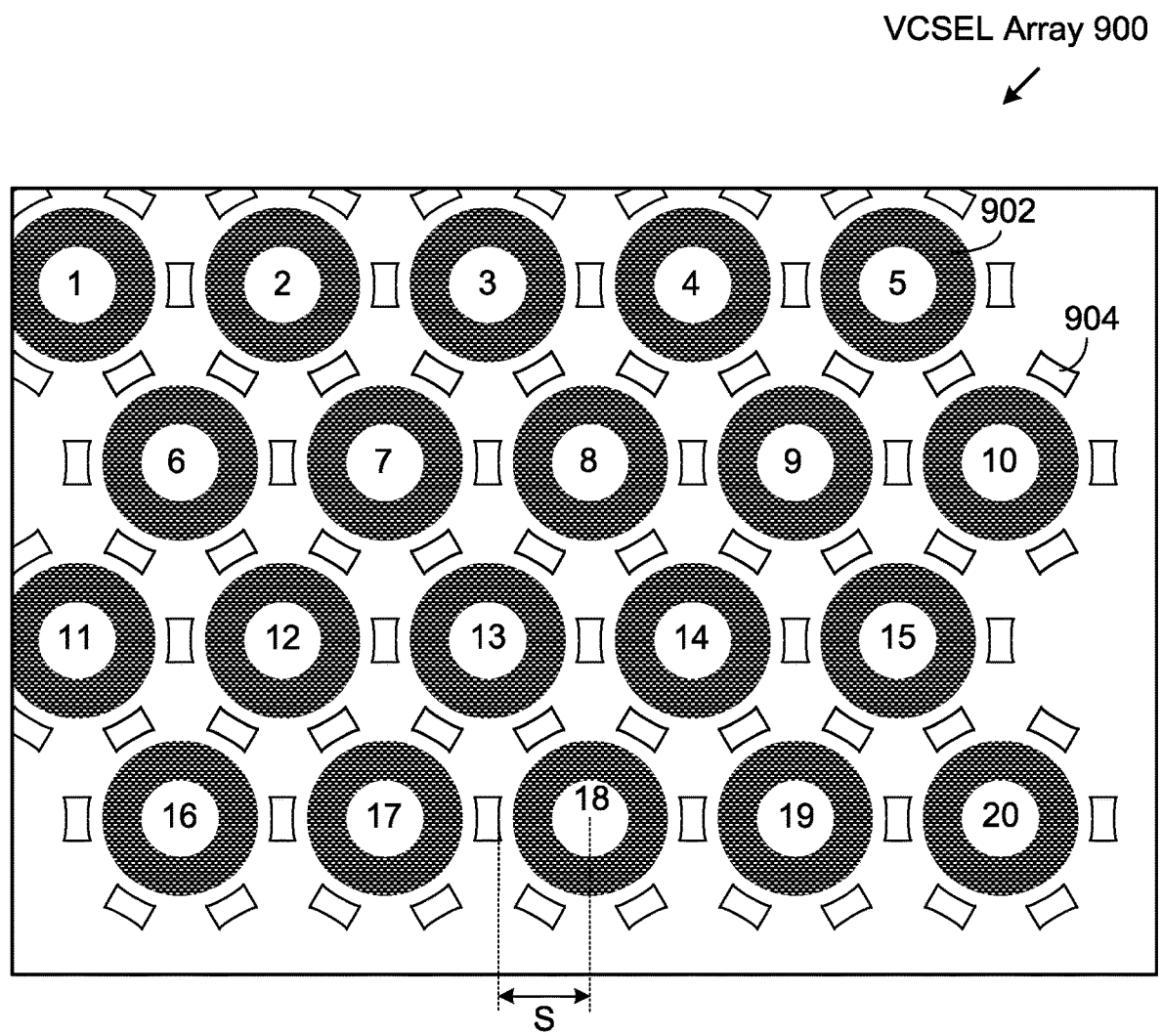
Figure 9C:
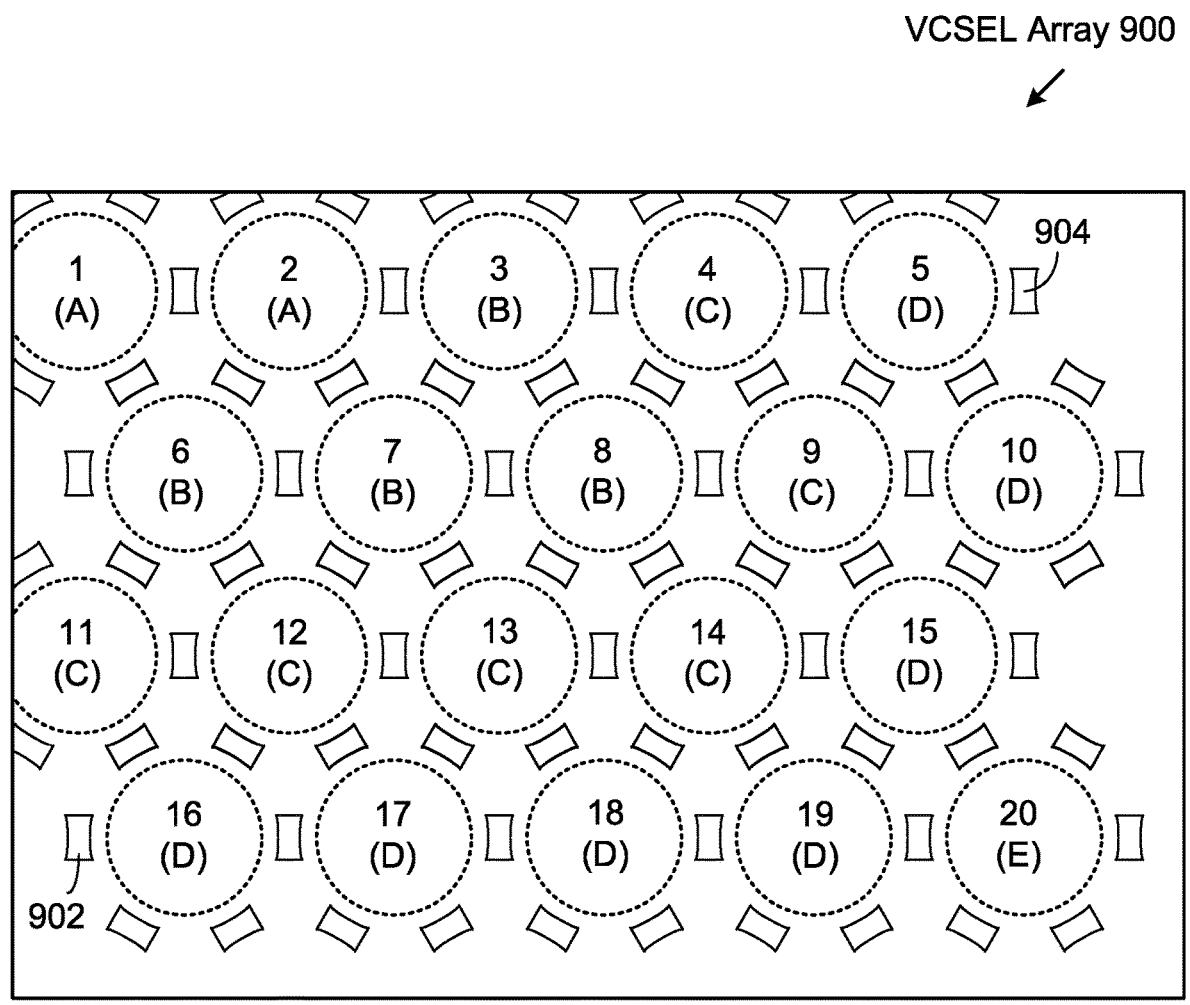

FIGS. 9A, 9B, and 9C schematically illustrate a VCSEL array 900 in top views according to another embodiment of the present invention. The top views show VCSELs 1-20 that represent a portion of VCSEL array 900 exemplarily. Among the VCSELs, VCSELs 1 and 2 may be in or close to the central region of the array, VCSELs 5, 10, 15, and 16-19 may be in or close to edge regions of the array, and VCSEL 20 may be in or close to a corner region of the array. The VCSELs of array 900 may have a similar structure and similar fabrication processes to the VCSELs of array 800, but the number of VCSELs and configuration of openings for an oxidation process. For example, VCSELs 1-20 each may include an active region, a top reflector region, a bottom reflector region, and an Al-rich layer. The Al-rich layer may be arranged proximate to a corresponding active region. The top reflector regions may include a conductive p-type DBR structure. The bottom reflector regions may include a conductive n-type DBR structure. The bottom reflector regions, active regions, and top reflector regions may be grown epitaxially over an n-type substrate in an epitaxial process. The active regions may include a MQW region.

After the epitaxial growth process, metal layers 902 may be formed over the top reflector regions. Metal layers 902 may have the same annular shape with the same or substantially similar dimensions, as shown schematically in FIG. 9A. Metal layers 902, as the anode of VCSEL array 900, electrically contact p+ layers of the p-type DBR structures and are electrically connected to the top reflector regions of the VCSELs, respectively. Thereafter, a dielectric layer (not shown) with a dielectric material may be deposited over metal layers 902 and some parts of the top reflector regions.

Thereafter, a selective etch process, such as a selective dry etch or dry and wet etch processes, may be performed to form openings 904 that surround each VCSEL of array 900, as shown in FIG. 9B, Openings 904 are arranged for conducting an oxidation process. Similar to openings 809 and 817 with respect to FIGS. 8A-8C, openings 904 may extend vertically through the top reflector regions, the active regions, and at least partially through the bottom reflector regions. Optionally, openings 904 may contain symmetrical pairs with respect to the center of a VCSEL structure, as shown in FIG. 9B.

Opening 904 may have curved edges that face oppositely and face the centers of two adjacent VCSEL structures that share the opening. The edges of openings 904 that face a center of a VCSEL structure are concentric to the center of the VCSEL structure. A distance between an opening 904 and a center of a VCSEL structure is S. Optionally, S may be the distance between the curved edge of an opening 904 and a center of a VCSEL structure, as shown in FIG. 91B.

The selective etch process exposes sides of the Al-rich layers in openings 904. Next, the oxidation process (e.g., a wet oxidation process) may be performed to partially oxidize the Al-rich layers and form oxide layers. The oxide layers spread laterally to form circular or circle-like oxide apertures for the VCSELs of array 900. The diameter of an oxide aperture may be determined by the value of S, the lateral oxidation rate, and the time of oxidation. As such, the diameter of an oxide aperture of a VCSEL may be larger when the VCSEL has a larger S than another VCSEL. Further, when a VCSEL has a larger S, the VCSEL may be configured to have a larger active region, larger top reflector region, and larger bottom reflector region. In some cases, when VCSELs of an array have different values of S, the VCSELs may have active regions, top reflector regions, and bottom reflector regions with the same or similar areas, respectively. In descriptions below, as an example, when a VCSEL of array 900 has a larger S, the VCSEL has a larger active region, larger top reflector region, and larger bottom reflector region.

As the metal layers of VCSELs 1-20 have the same or similar dimensions, some VCSELs may have smaller series resistance when they have a larger oxide aperture, larger active region, larger top reflector region, and larger bottom reflector region. Similar to the VCSEL arrays illustrated above, the series resistance difference may be used to improve intensity uniformity of VCSEL array 900.

In some embodiments, after the oxide apertures are formed, openings 904 may be filled with a dielectric material. Then, other fabrication processes may be performed to complete fabrication of VCSEL array 900. For example, isolation trenches or isolation regions may be formed to surround and isolate each VCSEL. On the bottom surface of the substrate, a metal layer may be deposited as the cathode of VCSEL array 900.

The series resistance may be configured to have different values among VCSELs 1-20 of array 900. For example, if some VCSELs are close to the central region of array 900 and experience higher temperature among VCSEL 1-20, these VCSELs may have smaller series resistance to counter larger power decrease during operation. As such, different oxide apertures may be configured to improve intensity uniformity for array 900.

In some embodiments, VCSELs of an array may be divided into groups based on the output power or temperature of individual VCSELs. For example, VCSELs having similar output power or similar temperature may form a group. A group may have one or more VCSELs and all VCSELs in a group may have an oxide aperture with the same or similar dimensions. Oxide apertures of VCSELs of the groups may be adjusted respectively to tune output power of the VCSELs for better intensity uniformity. Assuming that VCSELs of array 900 are divided into five groups, groups A to E. Before an adjustment process that adjusts dimensions of oxide apertures, oxide apertures of array 900 have the same dimension. As shown in FIG. 9C, letters A to E are used as labels of the groups, where metal layers 902 are omitted for simplicity. For example, VCSELs 3 and 6-8 each have a label "B", indicating they are with group B. In array 900, VCSELs of groups A and B are in or closer to the central region of the array, and the output power of individual VCSELs of groups A and B is relatively lower and the temperature is relatively higher. On the other hand, VCSELs of groups D and E are away from the central region and in or closer to the edge regions, and the output power of individual VCSELs of groups D and E is relatively higher and the temperature is relatively lower.

As illustrated above, groups A to E may be formed based on the individual output power of the VCSELs. VCSELs in a group may have similar or substantially similar output power, e.g., within a predetermined intensity range. Alternatively, groups A to E may be formed based on the temperature of the VCSELs. VCSELs in a group may have similar or substantially similar temperature, e.g., within a predetermined temperature range. The output power or temperature of a VCSEL may be measured by a power meter or temperature sensor, when a sample VCSEL array is available. Measurements may be performed after array 900 is in operation for a certain amount of time. Alternatively, the output power or temperature of a VCSEL may be obtained through a simulation method that simulates a VCSEL array operation. For array 900, the output power of individual VCSELs may increase gradually from group A to group E, while the temperature may decrease gradually from group A to group E.

Let P1, P2, P3, P4, and P5 be the output power of individual VCSELs in groups A to E, respectively. For example, P2 is the output power of each one of VCSELs 3 and 6-8 of group B. Let D1, D2, D3, D4, and D5 be the dimension (e.g., the diameter) of oxide aperture of VCSELs in groups A to E, respectively. For example, D2 is the dimension of oxide aperture of VCSELs 3 and 6-8 of group B. Let the individual value of D1 to D5 be D0 before the adjustment process. In some cases, D0 may be close to a desired number. Optionally, adjustment factor V may be calculated. For VCSEL array 900, adjustment factor Vn=SQRT(Pn/P1), where n=1-5, corresponding to groups A to E. In some cases, we may have Dn=D0/Vn, where n=1-5. As P1 is the smallest among groups A to E, Vn is larger than 1 and Dn is reduced after being divided by Vn for n=2-5. That is, oxide apertures of group A remain unchanged, while oxide apertures of other groups are reduced. From group A to group E (i.e., from a central region to edge regions of array 900), the dimension of oxide aperture decreases gradually, corresponding to the increase of output power or the decrease of temperature from groups A to E, which is obtained by measurement or simulation.

After values of D1 to D5 are determined, values of S for each group may be calculated. Then, oxide apertures with diameters from D1 and D5 may be formed using the values of S, the lateral oxidation rate, and a calculated oxidation time. After the oxide apertures are adjusted, the intensity uniformity of array 900 may be improved.

Alternatively, oxide apertures of array 900 may be tuned by another method. Let adjustment factor Vm=SQRT(P5/Pm), where m=1-5, corresponding to groups A to E. We may have Dm=D0*Vm, where m=1-5. As Vm is larger than 1 except V5, Dm is increased from D0 after being multiplied by Vm, where m=14. That is, the oxide aperture of group E remains unchanged, while oxide apertures of other groups are increased. From group A to group D, the amount of increase of oxide aperture decreases. Thereafter, values of S for groups A to E may be calculated. Oxide apertures with diameters from D1 and D5 may be formed using the values of S, the lateral oxidation rate, and a calculated oxidation time. After oxide apertures of VCSEL array 900 are modified, difference of the output power among the VCSELs may be reduced to a certain extent. The intensity uniformity of array 900 may be improved.

In some embodiments, an epitaxial growth, such as the epitaxial growth of active region 201 or 801, top reflector region 202 or 802, bottom reflector region 203 or 803, may be performed by metalorganic chemical vapor deposition (MOCVD). In some cases, an opening may be filled by chemical vapor deposition (CVD) and/or physical vapor deposition (PVD). Optionally, a metal layer may be deposited by C V D, PVD, or atomic layer deposition (ALD), or a combination of at least two of CVD, PVD, and ALD.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A Vertical Cavity Surface Emitting Laser (VCSEL) array, comprising:
a substrate; and
a plurality of VCSEL structures over the substrate, each VCSEL structure comprising:
a first reflector region formed over the substrate;
an active region formed over the first reflector region;
a second reflector region formed over the active region; and
an oxide aperture formed proximate to the active region,
wherein the plurality of VCSEL structures include a first VCSEL structure that is in a central region of the VCSEL array and a second VCSEL structure that is in an edge region of the VCSEL array, a radial dimension of an oxide aperture of the first VCSEL structure approximately equals a radial dimension of an oxide aperture of the second VCSEL structure, and a second reflector region of the first VCSEL structure is larger than a second reflector region of the second VCSEL structure.

2. The VCSEL array of claim 1, wherein the first second reflector region of the first VCSEL structure comprises a Distributed Bragg Reflector (DBR) structure.

3. The VCSEL array of claim 1, wherein the second reflector region of the first VCSEL structure has a gear shape.

4. The VCSEL array of claim 3, wherein a gear tooth of the second reflector region of the first VCSEL structure is larger than a gear tooth of the second reflector region of the second VCSEL structure.

5. The VCSEL array of claim 1, wherein the plurality of VCSEL structures are isolated by isolation trenches or ion implantation regions.

6. The VCSEL array of claim 1 further comprises a plurality of metal layers formed over each second reflector region.

7. The VCSEL array of claim 6, wherein the plurality of metal layers have a same shape with a same dimension or similar dimensions.

8. The VCSEL array of claim 1, wherein the plurality of VCSEL structures are divided into a plurality of groups, and dimensions of oxide apertures of one of the plurality of groups have a same value or similar values.

9. A method for fabricating a Vertical Cavity Surface Emitting Laser (VCSEL) array, comprising:
fabricating a plurality of VCSEL structures over a substrate,
wherein fabricating each VCSEL structure comprises:
forming a first reflector region over the substrate;
forming an active region over the first reflector region;
forming a second reflector region over the active region; and
forming an oxide aperture proximate to the active region,
wherein the plurality of VCSEL structures include a first VCSEL structure that is in a central region of the VCSEL array and a second VCSEL structure that is in an edge region of the VCSEL array, a radial dimension of an oxide aperture of the first VCSEL structure approximately equals a radial dimension of an oxide aperture of the second VCSEL structure, and a second reflector region of the first VCSEL structure is larger than a second reflector region of the second VCSEL structure.

10. The method of claim 9, wherein forming the second reflector region of the first VCSEL structure comprises forming a Distributed Bragg Reflector (DBR) structure.

11. The method of claim 9, wherein the second reflector region of the first VCSEL structure has a gear shape.

12. The method of claim 11, wherein a gear tooth of the second reflector region of the first VCSEL structure is larger than a gear tooth of the second reflector region of the second VCSEL structure.

13. The method of claim 9 further comprises isolating the plurality of VCSEL structures by isolation trenches or ion implantation regions.

14. The method of claim 9 further comprises forming a plurality of metal layers over each second reflector region.

15. The method of claim 14, wherein the plurality of metal layers have a same shape with a same dimension or similar dimensions.

16. The method of claim 9 further comprises dividing the plurality of VCSEL structures into a plurality of groups, wherein dimensions of oxide apertures of one of the plurality of groups have a same value or similar values.

17. A Vertical Cavity Surface Emitting Laser (VCSEL) array, comprising:
- a substrate;
- a plurality of first VCSEL structures over the substrate; and
- a plurality of second VCSEL structures over the substrate, wherein the plurality of first VCSEL structures each are closer to a central region of the VCSEL array than the plurality of second VCSEL structures, a radial dimension of oxide apertures of the plurality of first VCSEL structures approximately equals a radial dimension of oxide apertures of the plurality of second VCSEL structures, and a reflector region over an active region of the plurality of first VCSEL structures is larger than a reflector region over an active region of the plurality of second VCSEL structures.

18. The VCSEL array of claim 17, wherein the reflector region of the plurality of first VCSEL structures has a gear shape.

19. The VCSEL array of claim 18, wherein a gear tooth of the reflector region of the plurality of first VCSEL structures is larger than a gear tooth of the reflector region of the plurality of second VCSEL structures.

20. The VCSEL array of claim 17, wherein a metal layer over the reflector region of the plurality of first VCSEL structures and a metal layer over the reflector region of the plurality of second VCSEL structures have a same shape with a same dimension or similar dimensions.

* * * * *